US007228358B1

(12) United States Patent
McManus

(10) Patent No.: US 7,228,358 B1
(45) Date of Patent: Jun. 5, 2007

(54) METHODS, APPARATUS AND DATA STRUCTURES FOR IMPOSING A POLICY OR POLICIES ON THE SELECTION OF A LINE BY A NUMBER OF TERMINALS IN A NETWORK

(75) Inventor: Jean M. McManus, Arlington, VA (US)

(73) Assignee: Verizon Services Corp., Arlington, VA (US)

( * ) Notice: Subject to any disclaimer, the term of this patent is extended or adjusted under 35 U.S.C. 154(b) by 469 days.

(21) Appl. No.: 09/625,252

(22) Filed: Jul. 25, 2000

(51) Int. Cl.
*G06F 15/173* (2006.01)
(52) U.S. Cl. ............... 709/239; 709/238; 709/223; 709/225
(58) Field of Classification Search ............... 709/222, 709/225–230, 238, 239; 370/356–360
See application file for complete search history.

(56) References Cited

U.S. PATENT DOCUMENTS 5,790,801 A * 8/1998 Funato ............... 709/229
5,841,840 A * 11/1998 Smith et al. ............ 379/93.01
5,905,781 A * 5/1999 McHale et al. ......... 379/93.14
5,926,472 A * 7/1999 Byers ............... 370/360
6,215,785 B1 * 4/2001 Batruni et al. ............ 370/360
6,396,837 B1 * 5/2002 Wang et al. ........... 370/395.21
6,483,870 B1 * 11/2002 Locklear et al. ............ 375/222
6,587,877 B1 * 7/2003 Douglis et al. ............ 709/224

OTHER PUBLICATIONS

PPP Over Ethernet—A Differentiating Advantage for Internet Service Providers and Carriers Redback Networks Date: Mar. 1999 pp. 1-8.*
A Method for Transmitting PPP Over Ethernet (PPPoE), L. Mamakos, K. Lidl, J. Evarts, D. Carrel, D. Simone, R. Wheeler Feb. 1999.*

* cited by examiner

*Primary Examiner*—Krisna Lim
*Assistant Examiner*—Aaron Strange

(57) ABSTRACT

Enforcing user defined and/or configurable policies to select which (e.g., DSL) line a (e.g., PPPoE) session would use when there are multiple lines present. This avoids the adverse network conditions that exist if the multiple DSL lines are directly connected to the premises local area network (or "LAN"). Once a line is selected, the session may be supported, in its entirety, over that selected line. A device may include embedded (e.g., DSL) modems so external ATU-Rs would not be required. Furthermore, the complexity of the modem functionality would be reduced since the embedded modem would not require the learning bridge logic, which is currently implemented in external PPPoE capable modems. No changes to premises networking equipment (hubs, bridges, PCs) would be required.

32 Claims, 22 Drawing Sheets

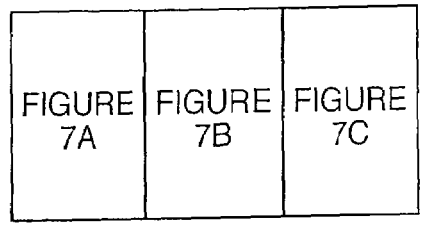
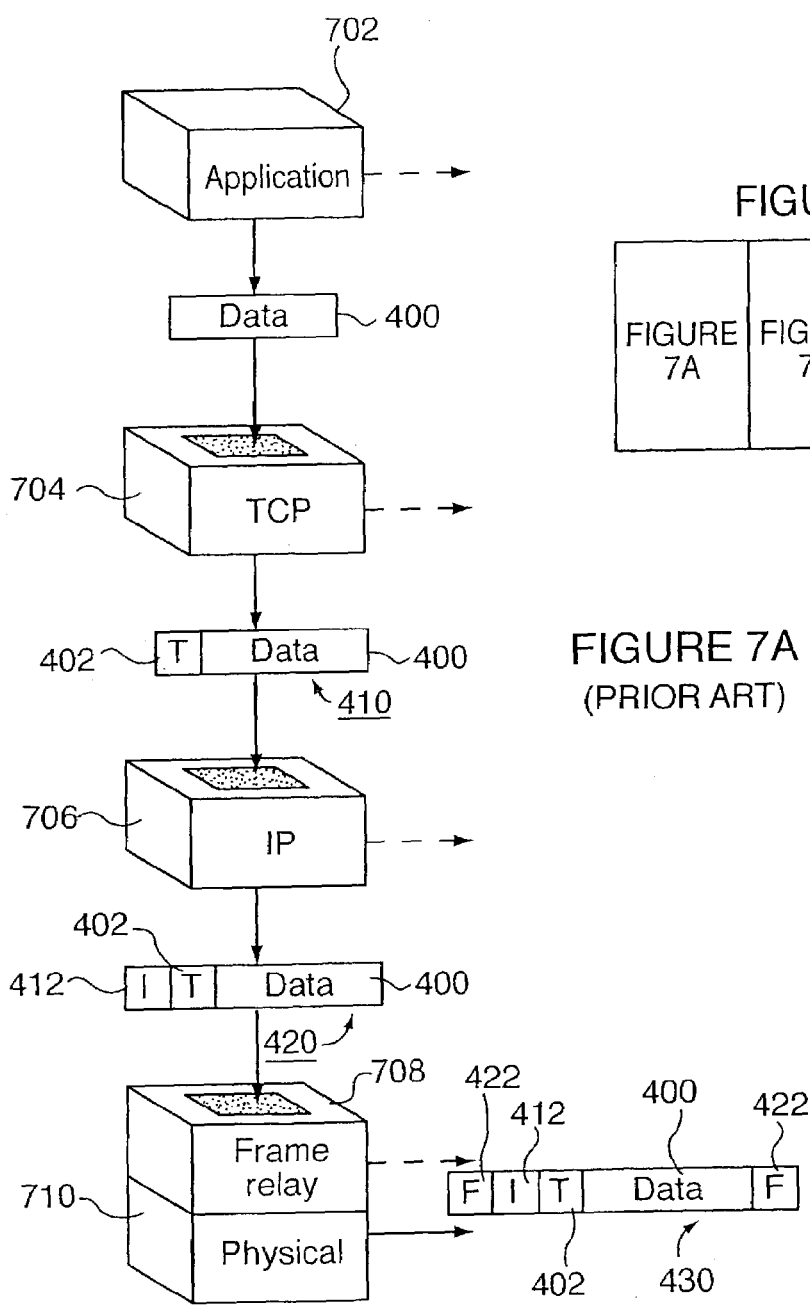
FIGURE 7A
(PRIOR ART)

| | | | | | |
|---|---|---|---|---|---|
| 0xffffffff | | | | | |
| 0xffff | HOST MAC ADDRESS | | | | |
| HOST MAC ADDRESS (CONTINUED) | | | | | |
| ETHER_TYPE = 0x8863 | VERSION = 1  1310' | TYPE = 1  1320' | CODE = 0X09  1340' | | |
| SESSION ID = 0x0000  1350' | LENGTH = 0x0004  1360' | | | | |
| TAG_TYPE = 0x0101  1370' | TAG_LENGTH = 0x0000  1370'' | | | | |

FIGURE 11
*(PRIOR ART)*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| VERSION | TYPE    |           CODE          |    SESSION ID   |
|   1310  |  1320   |           1340          |       1350      |
+---------+---------+-------------------------+-----------------+
|         LENGTH              |                                 |
|          1360               |            PAYLOAD              |
+-----------------------------+            1370                 |
                              |                                 |
```

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|        TAG_TYPE               |        TAG_LENGTH             |
|          1410                 |           1420                |
+-------------------------------+-------------------------------+
|                           TAG_VALUE                           |
|                             1430                              |
+---------------------------------------------------------------+
```

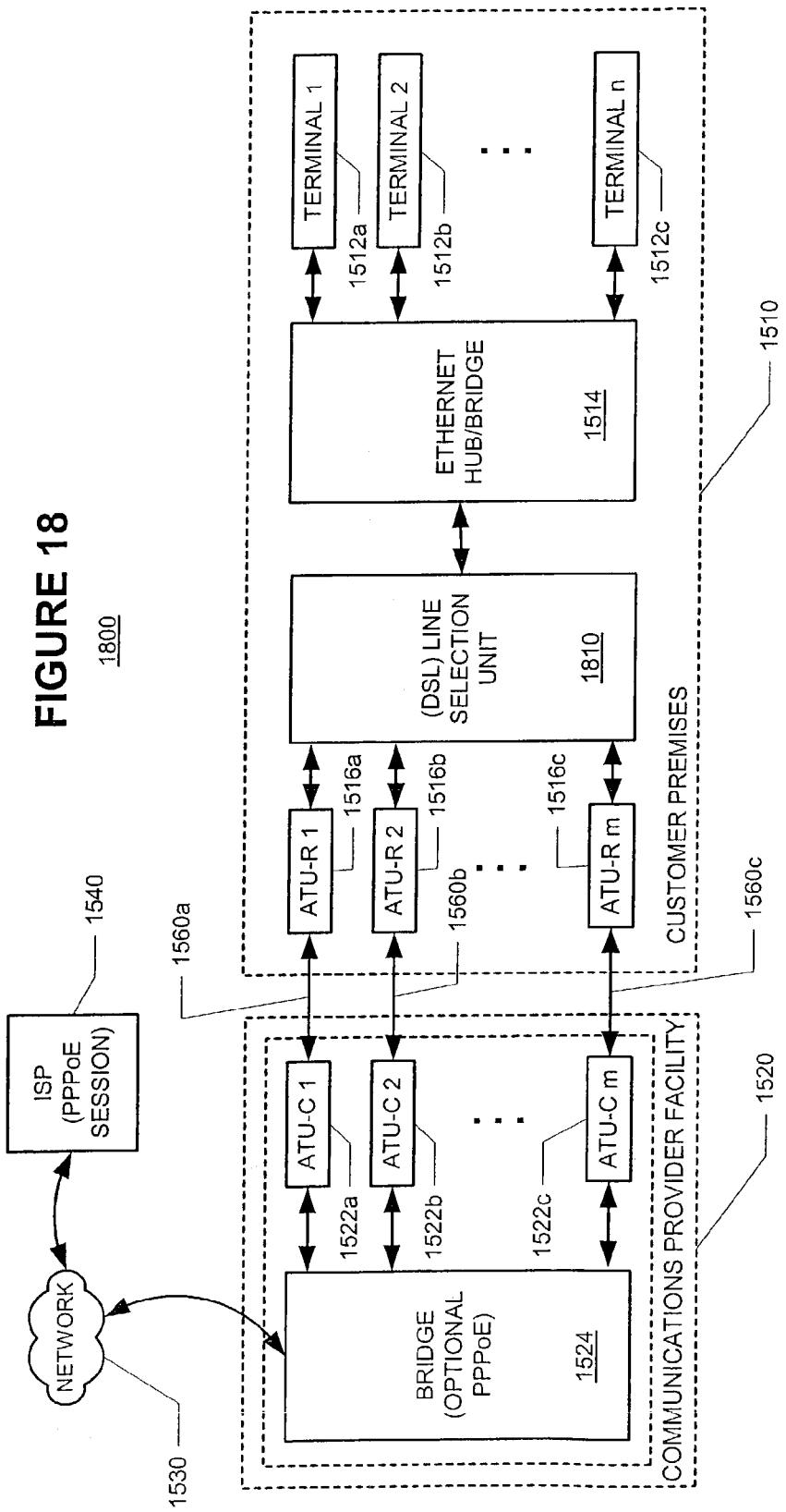

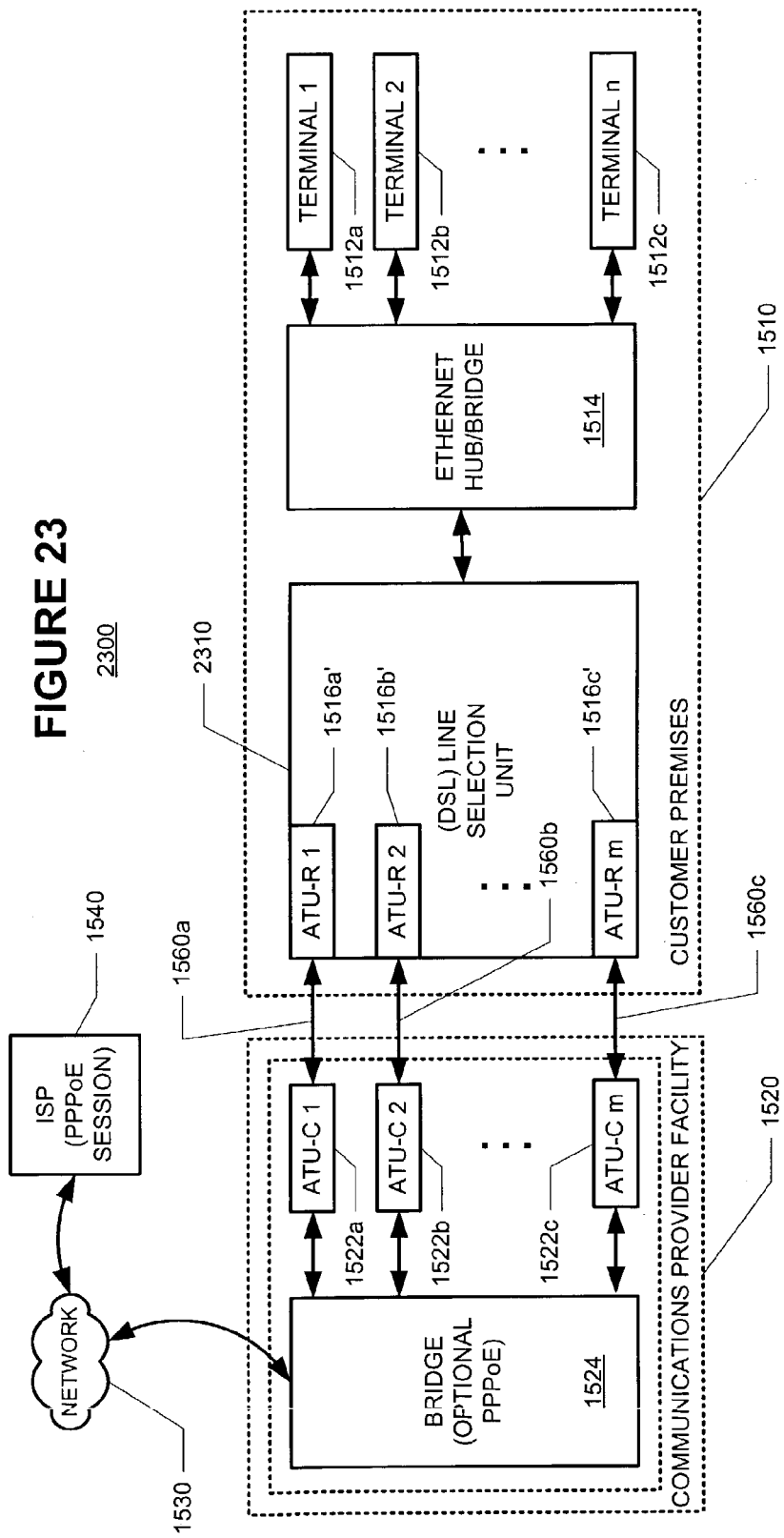

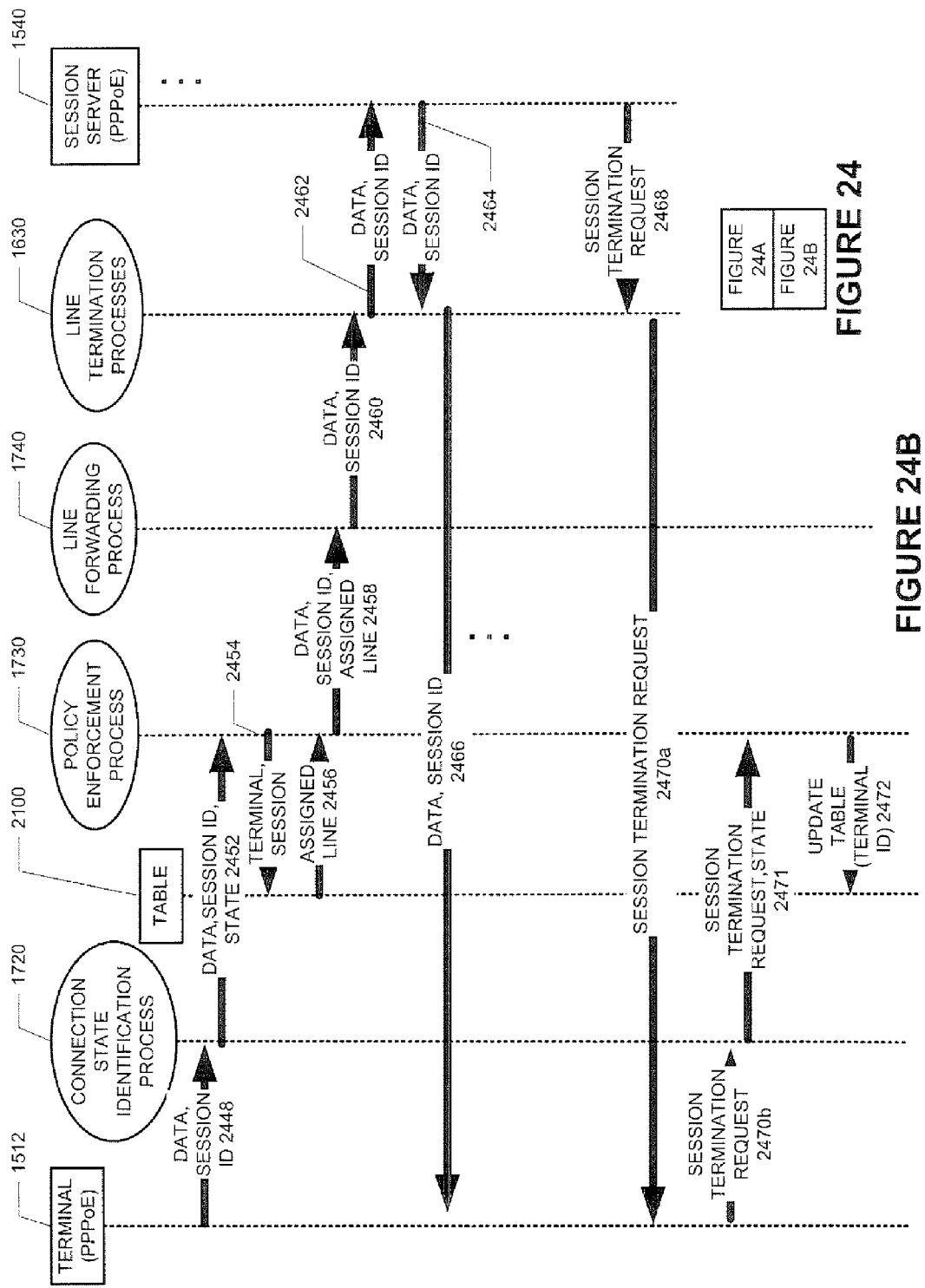

METHODS, APPARATUS AND DATA STRUCTURES FOR IMPOSING A POLICY OR POLICIES ON THE SELECTION OF A LINE BY A NUMBER OF TERMINALS IN A NETWORK

§ 1. BACKGROUND OF THE INVENTION

§ 1.1 Field of the Invention

The present invention concerns accessing a packet network, such as the Internet for example, over a number of lines, such as digital subscriber lines (or "DSL lines") for example. More specifically, the present invention concerns the selection of one of the lines over which access to the packet network is facilitated.

§ 1.2 Related Art

The description of art in this section is not, and should not be interpreted to be, an admission that such art is prior art to the present invention. First, since the present invention often refers to communications protocols, the concept of a communications protocol stack is introduced in § 1.2.1 below for the reader's convenience. Then, network architecture reference models are introduced in § 1.2.2 below for the reader's convenience. These two (2) sections introduce certain concepts and terms that are well known to those skilled in the art. Then, accessing a packet (e.g., IP) network (e.g., the Internet) is described in § 1.2.3 below for the reader's convenience. Finally, challenges faced by customers, having at least one local area network (or LAN), accessing the network via multiple lines, such as digital subscriber lines (or DSL lines) for example, are described in § 1.2.4 below.

§ 1.2.1 Communications Protocol Stack

Although networking software and network reference models are known to those skilled in the art, they are introduced here for the reader's convenience.

To reduce their complexity, networks may be organized as a series of layers or levels, each one built upon the one below it as shown in FIG. 1. Each layer functions to offer certain services to the higher layer, thereby shielding those higher layers from the details of how the offered services are actually implemented. The entities comprising the corresponding layers on different machines are called "peers". Such peers use rules and conventions, also referred to as the layer n protocol, to communicate with each other as depicted by the dashed lines in FIG. 1. Actually, no data are directly transferred from layer n on one machine to layer n on another machine. Rather, each layer passes data and control information to the layer immediately below it, until the lowest layer (layer 1) is reached. Below layer 1, is a physical medium 110 through which actual communications take place. Thus, referring to FIG. 1, actual communications take place via the solid lines and the physical medium 110, while virtual peer-to-peer communications occur via the dashed lines.

Still referring to FIG. 1, interfaces are arranged between adjacent layers. Each of these interfaces defines primitive operations and services that the lower layer offers to the upper layer.

The set of layers and protocols may be referred to, collectively, as a "network architecture". A list of protocols used by a system, one protocol per layer, may be referred to as a "protocol stack" or "protocol suite".

§ 1.2.2 Network Architecture Reference Models

FIG. 2 illustrates a comparison of the Open Systems Interconnection (or "OSI") reference model 210 for network architectures and the transfer control protocol/Internet protocol (or "TCP/IP") reference model 220 for network architectures. Although those skilled in the art will be familiar with both reference models, each is introduced below for the reader's convenience.

§ 1.2.2.1 The OSI Reference Model

As shown in FIG. 2, the OSI reference model 210 has seven (7) distinct layers; namely, (i) a physical layer 211, (ii) a data link layer 212, (iii) a network layer 213, (iv) a transport layer 214, (v) a session layer 215, (vi) a presentation layer 216, and (vii) an application layer 217. Each layer is briefly introduced below.

The physical layer 211 deals with transmitting raw bits over a communications channel. Thus, the physical layer is typically concerned with mechanical, electrical, optical, and procedural interfaces, as well as the physical transmission medium (e.g., twisted copper pair, co-axial cable, optical fiber, etc.) which lies below the physical layer.

The data link layer 212 functions to transform a raw communications facility into a line that appears free from undetected transmission errors to the network layer 213. The data link layer 212 does this by having the sending host segment its data into "data frames", transmitting these frames to the receiving host, and processing "acknowledgement frames" sent back from the receiver.

The network layer 213 functions to control the operation of a subnetwork between the hosts and controls the routing of packets between the hosts.

The transport layer 214 functions to accept data from the session layer 215 and segment this data into smaller units, if necessary, for use by the network layer 213. The transport layer 214 also determines a type of service (e.g., an error-free, point-to-point service) to provide to the session layer 215. Further, the transport layer 214 controls the flow of data between hosts. The transport layer 214 is a true "end-to-end" layer, from source host to destination host, since a program on the source machine converses with a similar program on the destination machine, using message headers and control messages.

The session layer 215 functions to allow different machines to establish sessions between them. The session layer 215 may manage dialog control and maintain synchronization.

The presentation layer 215 concerns the syntax and semantics of information transmitted.

The application layer 216 may function to define network virtual terminals that editors and other programs can use, and to transfer files.

§ 1.2.2.2 The TCP/IP Model

In recent decades, and in the past five (5) to ten (10) years in particular, computers have become interconnected by networks by an ever increasing extent; initially, via local area networks (or "LANs"), and more recently via LANs, wide area networks (or WANs) and the Internet. In 1969, the Advanced Research Projects Agency (ARPA) of the U.S. Department of Defense (DoD) deployed ARPANET as a way to explore packet-switching technology and protocols that could be used for cooperative, distributed, computing. Early on, ARPANET was used by the TELNET application which permitted a single terminal to work with different types of computers, and by the file transfer protocol (or "FTP") which permitted different types of computers to transfer files from one another. In the early 1970s', electronic mail became the most popular application which used ARPANET.

Since this packet switching technology was so successful, the ARPA applied it to tactical radio communications (Packet Radio) and to satellite communications (SATNET). However, since these networks operated in very different communications environments, certain parameters, such as maximum packet size for example, were different in each case. Thus, methods and protocols were developed for "internetworking" these different packet switched networks. This work lead to the transmission control protocol (or "TCP") and the internet protocol (or "IP") which became the TCP/IP protocol suite. Although the TCP/IP protocol suite, which is the foundation of the Internet, is known to those skilled in the art, it is briefly described below for the reader's convenience.

As shown in FIG. 2, the TCP/IP reference model 220 includes a physical layer 221, a network access layer 222, an internet layer 223, a transport layer 224, and an application layer 225. Each of these layers is briefly introduced below.

The physical layer 221 defines the interface between a data transmission device (e.g., a computer) and a transmission medium (e.g., twisted pair copper wires, co-axial cable, optical fiber, etc.). It specifies the characteristics of the transmission medium, the nature of the signals, the data rate, etc.

The network access layer 222 defines the interface between an end system and the network to which it is attached. It concerns access to, and routing data across, a network. Frame relay is an example of a network access layer.

The internet layer 223 functions to permit hosts to inject packets into any network and have them travel independently to the destination machine (which may be on a different network). Since these packets may travel independently, they may event arrive in an order other than the order in which they were sent. Higher layers can be used to reorder the packets. Thus, the main function of the internet layer 320 is to deliver (e.g., route) IP packets to their destination.

The transport layer 224 is an end-to-end protocol. For example, the transmission control protocol (or "TCP") is a reliable connection-oriented protocol that allows a byte stream originating on one machine to be delivered, without error, on any other machine on the Internet. More specifically, the TCP protocol fragments an incoming data stream into discrete messages, each of which is passed to the internet layer 223. At the destination, the TCP protocol reassembles the received messages into an output stream.

The TCP/IP model 220 does not have session and presentation layers. Instead, an application layer 225 contains all of the higher-level protocols which are used to support various types of end use applications (e.g., the simple mail transfer protocol (or "SMTP") for e-mail, the file transfer protocol (or "FTP"), etc.).

The TCP/IP model does not define what occurs below the internet layer 223, other than to note that the host has to connect to the network using some protocol so that it can send IP packets over it. This protocol varies from host to host and network to network.

Basically, each of the layers encapsulates, or converts, data in a higher level layer. For example, referring to FIG. 4, user data 400 as a byte stream is provided with a TCP header 402 to form a TCP segment 410. The TCP segment 410 is provided with an IP header 412 to form an IP datagram 420. The IP datagram 420 is provided with a network header 422 to define a network-level packet 430. The network-level packet 430 is then converted to radio, electrical, optical (or other) signals sent over the transmission medium at a specified rate with a specified type of modulation.

The TCP header 402, as illustrated in FIG. 5, includes at least twenty (20) octets (i.e., 160 bits). Fields 502 and 504 identify ports at the source and destination systems, respectively, that are using the connection. Values in the sequence number 506, acknowledgement number 508 and window 516 fields are used to provide flow and error control. The value in the checksum field 518 is used to detect errors in the TCP segment 410.

FIGS. 6A and 6B illustrate two (2) alternative IP headers 412 and 412', respectively. Basically, FIG. 6A depicts the IP protocol (Version 4) which has been used. FIG. 6B depicts a next generation IP protocol (Version 6) which, among other things, provides for more source and destination addresses.

More specifically, referring to FIG. 6A, the four (4) bit version field 602 indicates the version number of the IP, in this case, version 4. The four (4) bit Internet header length field 604 identifies the length of the header 412 in 32-bit words. The eight (8) bit type of service field 606 indicates the service level that the IP datagram 420 should be given. The sixteen (16) bit total length field 608 identifies the total length of the IP datagram 420 in octets. The sixteen (16) bit identification field 610 is used to help reassemble fragmented user data carried in multiple packets. The three (3) bit flags field 612 is used to control fragmentation. The thirteen (13) bit fragment offset field 614 is used to reassemble a datagram 420 that has become fragmented. The eight (8) bit time to live field 616 defines a maximum time that the datagram is allowed to exist within the network it travels over. The eight (8) bit protocol field 618 defines the higher-level protocol to which the data portion of the datagram 420 belongs. The sixteen (16) bit header checksum field 620 permits the integrity of the IP header 412 to be checked. The 32-bit source address field 322 contains the IP address of the sender of the IP datagram 420 and the 32-bit destination address field contains the IP address of the host to which the IP datagram 120 is being sent. Options and padding 626 may be used to describe special packet processing and/or to ensure that the header 412 is a complete multiple of 32-bit words.

Referring to FIG. 6B, the four (4) bit version field 602 indicates the version number of the IP, in this case, version 6. The four (4) bit priority field 628 enables a sender to prioritize packets sent by it. The 24-bit flow label field 630 is used by a source to label packets for which special handling is requested. The sixteen (16) bit payload length field 632 identifies the size of data carried in the packet. The eight (8) bit next header field 634 is used to indicate whether another header is present and if so, to identify it. The eight (8) bit hop limit field 636 serves to discard the IP datagram 420 if a hop limit (e.g., the number of times the packet is routed) is exceeded. Also provided are 128-bit source and destination address fields 322' and 324', respectively.

Having described the TCP/IP protocol stack 220, the routing of a TCP/IP packet is now described.

A TCP/IP packet is communicated over the Internet (or any internet or intranet) via routers. Basically, routers in the Internet use destination address information (Recall fields 624 and 624'.) to forward packets towards their destination. Routers interconnect different networks. More specifically, routers accept incoming packets from various connected networks, use a look-up table to determine a network upon which the packet should be placed, and routes the packet to the determined network.

FIG. 7, which includes FIGS. 7A through 7C, illustrates the communication of data from a sender, to a receiver, using the TCP/IP protocol stack. Referring first to FIG. 7A, an application protocol 702 prepares a block of data (e.g., an e-mail message (SMTP), a file (FTP), user input (TELNET), etc.) 400 for transmission. Before the data 400 are sent, the sending and receiving applications agree on a format and encoding and agree to exchange data (Recall, e.g., the peer-to-peer communications depicted with dashed lines in FIG. 1.). If necessary, the data are converted (character code, compression, encryption, etc.) to a form expected by the destination device.

The TCP layer 704 may segment the data block 400, keeping track of the sequence of segments. Each TCP segment 410 includes a header 402 containing a sequence number (recall field 506) and a frame check sequence to detect errors. A copy of each TCP segment is made so that if a segment is lost or damaged, it can be retransmitted. When an acknowledgement of safe receipt is received from the receiver, the copy of the segment is erased.

The IP layer 706 may break the TCP segment into a number of datagrams 420 to meet size requirements of networks over which the data will be communicated. Each datagram includes the IP header 412.

A network layer 708, such as frame relay for example, may apply a header and trailer 422 to frame the datagram 420. The header may include a connection identifier and the trailer may contain a frame check sequence for example. Each frame 430 is then transmitted, by the physical layer 710, over the transmission medium as a sequence of bits.

FIG. 7B illustrates the operation of the TCP/IP protocol stack at a router in the network. The physical layer 712 receives the incoming signal 430 from the transmission medium and interprets it as a frame of bits. The network (e.g., frame relay) layer 714 then removes the header and trailer 422 and processes them. A frame check sequence may be used for error detection. A connection number may be used to identify the source. The network layer 714 then passes the IP datagram 420 to the IP layer 718.

The IP layer examines the IP header 412 and makes a routing decision (Recall the destination address 324, 324'). A logical link control (or "LLC") layer 720 uses a simple network management protocol (or "SNMP") and adds a header 750 which contains a sequence number and address information. Another network layer 722 (e.g., media access control (or "MAC")) adds a header and trailer 760. The header may contain address information and the trailer may contain a frame check sequence. The physical layer 724 then transmits the frame 450 over another transmission medium.

FIG. 7C illustrates the operation of the TCP/IP protocol stack at a receiver. The physical layer 732 receives the signals from the transmission medium and interprets them as a frame of bits. The network layer 734 removes the header and trailer 760 and processes them. For example, the frame check sequence in the trailer may be used for error detection. The resulting packet 440 is passed to the transport layer 736 which processes the header 750 for flow and error control. The resulting IP datagram 420 is passed to the IP layer 738 which removes the header 412. Frame check sequence and other control information may be processed at this point.

The TCP segment 410 is then passed to the TCP layer 740 which removes the header 402 and may check the frame check sequence. (In the event of a match, the match is acknowledged and in the event of a mismatch, the packet is discarded.) The TCP layer 740 then passes the data 400 to the application layer 742. If the user data was segmented (or fragmented), the TCP layer 740 reassembles it. Finally, the application layer 742 performs any necessary transformations, such as decompression and decryption for example, and directs the data to an appropriate area of the receiver, for use by the receiving application.

Having described the concept of a network architecture, as well as the OSI reference model and the TCP/IP protocol suite, certain background technologies, all related to accessing a packet network, are now introduced in § 1.2.3 below.

§ 1.2.3 Packet (e.g., Internet or IP) Network Access

The present invention is related to accessing a packet network such as the Internet for example. To appreciate at least some of the advantages of the present invention, certain technologies associated with accessing a packet network should be understood. Although these technologies are understood by those skilled in the art, they are introduced below for the reader's convenience. More specifically, the point-to-point protocol (or "PPP") is introduced in § 1.2.3.1 below, local area networks and Ethernet are introduced in § 1.2.3.2 below, digital subscriber line (or "DSL") services are introduced in § 1.2.3.3 below, and the point-to-point protocol over Ethernet (PPPoE) protocol is introduced in § 1.2.3.4 below.

§ 1.2.3.1 Point-to-Point Protocol ("PPP")

Briefly stated, the point-to-point protocol (or ("PPP") is a data link layer (i.e., layer 2) protocol that allows a computer to connect to the Internet via a standard dial-up telephone line and a modem. Typically, the computer will call up an Internet service provider (or "ISP"). The computer may merely function as a character-oriented terminal logged into the Internet service provider's time-sharing system. In this mode, also referred to as a "shell account", a user can type commands and run programs, but graphical Internet services, such as the World Wide Web for example, are not available. On the other hand, a computer can call the Internet service provider's router and act like a full-blown Internet host, in which case, all Internet services, including graphical services, are available.

The serial line IP (or "SLIP") protocol was the first widely used point-to-point data link protocol. In accordance with the SLIP protocol, a computer would just send raw IP packets over the line, with a special framing flag byte at the end. Unfortunately, SLIP has a number of serious problems. First, it doesn't detect or correct errors—higher layers are left to deal with these functions. Second, SLIP supports only IP. Third, each party's IP address must be known by the other in advance. That is, neither IP address can be dynamically assigned during setup. This third limitation precludes, as a practical matter, the use of SLIP by various Internet service providers since they often dynamically assign a number of Internet addresses to their customers (so that they can service a number of customers which is greater than the number of Internet addresses that they have). Fourth, SLIP does not support authentication. Finally, since SLIP is not an approved Internet standard, many different and incompatible versions exist.

The point-to-point protocol (or "PPP") was designed to overcome the problems of the SLIP protocol. That is, among other improvements, PPP detects errors, supports multiple protocols, permits IP addresses to be negotiated at connection time, and permits authentication. Basically, PPP provides (1) a framing method that unambiguously delineates the start and end of frames and that handles error detection, (2) a link control protocol (or "LCP") for bringing lines up, testing the times, negotiating options, and bringing the lines down, and (3) a way to negotiate network-layer options independently of the network layer protocol to be used.

FIG. 8 illustrates a PPP full frame format 800. This frame 800 may use character stuffing to ensure that all frames are an integral number of bytes. The frame 800 starts with a standard high-level data link control (or "HDLC") flag byte "01111110", denoted 810. An address field 820 is typically always set to "11111111" to indicate that all stations are to accept the frame. A control field 830 may be used to number a sequence of frames, although a default value of "00000011" indicates an unnumbered frame. Note that since, in a default mode, the address and control fields 820 and 830 are constant, two parties may negotiate to omit these fields, thereby saving two (2) bytes per frame, via the link control protocol (or "LCP"). A protocol field 840 identifies what type of packet (e.g., LCP, NCP, IP, IPX, AppleTalk, etc.) is in the payload field 850. Codes starting with a "0" bit are network layer protocols (e.g., IP, IXP, OSI, CLNP, XNS), while codes starting with a "1" bit are protocols (e.g., LCP, NCP) used to negotiate other protocols. The default size of the protocol field 840 is two (2) bytes. However, the parties can negotiate this field down to one (1) byte per frame, again via the link control protocol (or "LCP"). A payload field 850 has a variable length, up to a negotiated maximum value. If the length is not negotiated during line setup (e.g., via LCP), a default length of 1500 bytes is used. A checksum field 860 is used for error detection. The checksum field 860 has a default value of two (2) bytes, but can be negotiated to four (4) bytes. A standard high-level data link control (HDLC) flag byte "01111110", denoted 870, ends the frame 800.

Now, an exemplary operation of the PPP, in a situation where a user calls up an Internet service provider to make their computer a temporary Internet host, is described. The computer calls the Internet service provider's router via a modem. The router's modem then answers the call and establishes a physical connection. The computer then sends the router a series of LCP packets in the payload field 850 of one or more PPP frames 800. These packets and the responses from the router negotiate the PPP parameters to be used during the course of the call. Then, the computer sends a series of NCP packets to configure the network layer. For example, a computer typically wants to run the TCP/IP protocol stack and therefore needs an IP address. Since there are not enough IP addresses for each user to have a static, permanent, IP address, each Internet service provider typically obtains a number of IP addresses and dynamically assigns them to each attached device for the duration of a session with the attached device. In this way, the Internet service provider can have more customers than IP addresses (but cannot service all of its customers simultaneously). The NCP for IP is used to assign the IP address to the computer. At this point, the computer is an Internet host and can therefore send and receive IP packets, just as hardwired hosts can. When the use is done, the NCP is used to tear down the network layer connection, thereby freeing up the assigned IP address. The LCP is then used to terminate the data link layer connection. Finally, the computer instructs its modem to hang up the phone line, thereby releasing the physical layer connection. FIG. 9 illustrates a sequence of states that the PPP my go through when bringing up and tearing down (modem or router-router) line connections.

Having described how the point-to-point protocol may be used to establish a connection from a computer to the Internet, it should be noted that many computers are connected to a local area network (or LAN) and access the Internet via the LAN. Section 1.2.3.2 below introduces LANs in general, and Ethernet in particular.

§ 1.2.3.2 Local Area Networks (LANs) and Ethernet

Although those skilled in the art understand LANs and Ethernet, each is introduced here for the reader's convenience.

Local area networks (or "LANs") have been used to connect computers in offices, schools and factories to share resources (e.g., printers) and to exchange information. LANs are generally restricted in size. Thus, the worst-case transmission time is bounded and known in advance. Knowing this bound permits certain network designs, that would not be possible otherwise, to be used, and also simplifies network management. LANs typically use a single cable to which all machines are attached for transmitting communications amongst the machines. LANs may employ various topologies, such as bus, ring, etc.

Ethernet is a well known and widely deployed local area network (or "LAN") protocol. Ethernet has a bus (as opposed to a ring or star) topology. Devices on an Ethernet LAN can transmit whenever they want to—if two (2) or more packets collide, each device waits a random time and tries again. More specifically, as defined in IEEE 802.3, Ethernet is a LAN with persistent carrier sense multiple access (or "CSMA") and collision detection (or "CD"). If a device wants to transmit, it "listens" to the cable (hence the term "carrier sense"). If the cable is sensed as being busy, the device waits for the cable to become idle. If the cable is idle or becomes idle, the device transmits. If two (2) or more devices begin to transmit simultaneously (hence the term "multiple access"), there will be a collision which will be detected (hence the term "collision detection"). In the event of a collision, the devices causing the collision will (i) terminate their transmission, (ii) wait a random time, and (iii) try to transmit again (assuming that the cable is idle). Accordingly, a CSMA/CD cable or bus has one (1) of three (3) possible states—contention (or collision), transmission, or idle.

The IEEE 802.3 frame structure 1000 (or MAC Sublayer Protocol) is illustrated in FIG. 12. Each frame 1200 starts with a preamble 1210 of seven (7) bytes (each byte containing the pattern "10101010"). The Manchester encoding (which defines a "1" with a high-to-low signal transition and a "0" with a low-to-high signal transition) of this pattern produces a 10-MHz square wave for 5.6 μsec to allow the receiver's clock to synchronize with the sender's. The one (1) byte start of frame delimiter 1220 contains the pattern "10101011" to denote the start of the frame. The source and destination addresses 1230 and 1240, respectively, may be six (6) bytes (or 48 bits) long. The second most significant bit is used to distinguish local addresses from global addresses. Thus 46 bits are available for addresses (or about $7 \times 10^{13}$ unique addresses. Thus, any device can uniquely address any other device by using the right 48-bit address—it is up to the network layer to figure out how to locate the device associated with the destination address.

These 48-bit source and destination addresses 1230 and 1240, respectively, may be referred to as media access control (or "MAC") addresses. Basically, each device that may be connected to a network or the Internet has an assigned unique MAC address. (Some bits of the MAC address are assigned to various device manufactures. The manufactures then ensure that each device manufactured by it has a unique MAC address.)

The two (2) byte length of data field 1250 indicates the number of bytes (between 0 and 1500) present in the data field 1260. Valid frames 1200 must be at least 64 bytes long. Thus, if the data field 1260 is less than 46 bytes, the pad field 1270 is used to ensure that the frame 1200, from the destination address field 1230 through the checksum field 1280, is at least 64 bytes.

The four (4) byte checksum field 1280 is basically a 32-bit hash code of the data and can be used to detect errors in the data.

Having described how the point-to-point protocol may be used to establish a connection from a computer to the Internet in § 1.2.3.1 above, as well as LANs in general, and Ethernet in particular in § 1.2.3.2 above, a physical layer protocol, using standard twisted pair copper telephone lines, is introduced in § 1.2.3.3 below.

§1.2.3.3 Digital Subscriber Line ("DSL") Service

Although those skilled in the art understand digital subscriber line (or "DSL") services, they are introduced here for the reader's convenience.

Voice grade data modems are presently limited to approximately 56 Kbps. Bandwidth limitations of voice band lines often do not come from the subscriber line itself. Rather, they come from filters at the edge of the core network which limit voice grade bandwidth to about 3.3 or 4 kHz. Without such filters, copper access lines can pass frequencies into MHz regions, albeit with substantial attenuation. Such attenuation increases with line length, modulation frequency, and decreasing wire diameter (or increasing wire gauge).

Digital subscriber line (or "DSL") is a generic name for a group of digital services to be provided by local telephone companies to their local subscribers. DSL lines can carry both voice and data signals at the same time, in both directions, as well as signaling and call information data. High data rate DSL (or "HDSL") uses advanced modulation techniques to transmit 1.544 Mbps in bandwidths ranging from 80 kHz to 240 kHz. Such rates may be supported over 24 gauge lines up to 12,000 feet. Single line DSL (or "SDSL") is basically a single line version of HDSL. (Note that "SDSL" has also been used to refer to symmetric DSL.) Asymmetric DSL (or "ADSL") supports an asymmetric data stream, as its name implies, with much more bandwidth made available to a customer than from a customer. For example, downstream (i.e., to customer) rates of 1.544 Mbps, 2.048 Mbps, 6.312 Mbps and 8.448 Mbps may be supported on lines up to 18,000 feet, 16,000 feet, 12,000 feet, and 9,000 feet, respectively. Upstream (i.e., from customer) rates from 16 Kbps to 640 Kbps may also be supported. Both upstream and downstream data communications operate at frequencies above that of the plain old telephone service (or POTS), such that POTS service is independent of ADSL data services.

As can be appreciated from this sampling of digital service line (or "DSL") services, they are expected to be very popular, particularly for Internet access. FIG. 10 illustrates two (2) customers 1010 which use a DSL service to connect with an Internet service provider 1050. The first customer has a PC and a DSL modem 1020a. The DSL modem 1020a communicates with a digital subscriber line multiplexer (or "DSLAM") 1030 via a DSL line. The DSLAM 1030 forwards communications to the Internet service provider 1050 via a network 1040. The second customer 1010b has a number of computers in a local area network (LAN) defined by the Ethernet hub 1015. The hub 1015 is coupled with a DSL modem 1020a.

§ 1.2.3.4 Point-to-Point Protocol Over Ethernet

As described in § 1.2.3.2 above, in many access technologies, the most cost effective method to attach multiple hosts to the customer premise access device, is via Ethernet. PPP over Ethernet (or "PPPoE") enables a network of hosts to connect, over a simple bridging access device, to a remote access concentrator. With PPPoE, each host uses it's own PPP stack and the user is presented with a familiar user interface.

PPPoE has two (2) stages—a discovery stage and a PPP session stage. When a host wishes to initiate a PPPoE session, it first performs a discovery to identify the Ethernet MAC address of the peer and to establish a PPPoE SESSION_ID. In the discovery stage, a host (the client) discovers an access concentrator (the server). Based on the network topology, there may be more than one access concentrator that the host can communicate with. The discovery stage allows the host to discover all access concentrators and then select one. When the discovery stage completes successfully, both the host and the selected access concentrator have the information they will use to build their point-to-point connection over Ethernet. The discovery stage remains stateless until a PPP session is established. Once a PPP session is established, both the host and the access concentrator allocate the resources for a PPP virtual interface.

Since a PPPoE frame is very similar to the standard Ethernet frame 1200, the following will refer to the Ethernet frame 1200 of FIG. 12. Referring once again to the Ethernet frame 1200 of FIG. 12, the destination address field 1230 contains either a unicast Ethernet destination address, or the Ethernet broadcast address (0xffffffff). For discovery stage packets, the value is either a unicast or broadcast address. For the PPP session stage packets, this field 1230 contains the peer's unicast address (as determined from the discovery stage). The source address field 1240 contains the Ethernet MAC address of the source device. The length of data field 1250 is used as an ether type field 1250' in the context of PPPoE (this is the main difference between Ethernet and PPPoE frames) and may be set to either 0x8863 to indicate a discovery stage frame, or 0x8864 to indicate a PPP session stage frame.

The Ethernet payload 1260' for PPPoE is illustrated in FIG. 13. The version field 1310 is four (4) bits and may be set to 0x1, for example for a particular version of the PPPoE specification. The type field 1320 is four (4) bits and may be set to 0x1, for example for a particular version of the PPPoE specification. The code field is eight (8) bits and may be used to identify certain type of information used in the discovery and PPP session stages. The session ID field 1350 is sixteen (16) bits and is an unsigned value in network byte order. Its value is defined for discovery stage packets and is fixed for a given PPP session. The value of the session ID field 1350, as well as the values for the source and destination address fields 1230 and 1240, may be used to uniquely identify a PPPoE session. The length field 1360 is sixteen (16) bits. Its value, in network byte order, indicates the length of the PPPoE payload 1370.

Having introduced the PPPoE protocol and the PPP payload for PPPoE, the stages of the PPPoE protocol are now described. The discovery stage includes four (4) steps: (i) the Host broadcasting an initiation packet; (ii) one or more access concentrators sending offer packets; (iii) the host sending a unicast session request packet; and (iv) the selected access concentrator sending a confirmation packet. Once the host receives the confirmation packet, each of the peers know the PPPoE session ID and each other's Ethernet address. The host may proceed to the PPP session stage. When the access concentrator sends the confirmation packet, it may proceed to the PPP session stage.

All discovery stage Ethernet frames have the ether type field 1250' set to the value 0x8863. The PPPoE payload 1370 contains zero or more TAGs. A TAG is a TLV (type-length-value) construct and is illustrated in FIG. 14. The TAG type field 1410 is sixteen (16) bits in network byte order. The TAG length field 1420 is sixteen (16) bits. It is an unsigned number in network byte order, indicating the length in octets of the TAG value field 1430.

The discovery stage Ethernet packets, corresponding to the four (4) steps introduced above, are now described. Recall that in the first step, the host broadcasts an initialization packet. The initialization packet is referred to as a PPPoE Active Discovery Initiation (or "PADI") packet. The Host sends the PADI packet with the destination address 1230 set to the broadcast address. The code field 1340 is set to 0x09 and the session ID field 1350 is set to 0x0000. The PADI packet contains one TAG of having a Service-Name tag type 1410, indicating the service the host is requesting, and any number of other TAG types. FIG. 11 illustrates an exemplary PADI packet.

Recall that in the second step of the discovery stage, one or more access controllers send offer packets. An offer packet is referred to as a PPPoE Active Discovery Offer (or "PADO") packet. More specifically, when an access concentrator receives a PADI packet that it can serve, it replies by sending a PADO packet. The destination address 1230 is simply the unicast address of the host that sent the PADI packet. The code field 1340 is set to 0x07 and the session ID field 1350 is set to 0x0000. The PADO packet contains one AC-Name TAG containing the access concentrator's name, a Service-Name TAG identical to the one in the PADI packet, and any number of other Service-Name TAGs indicating other services that the access concentrator offers. If the access concentrator cannot serve the PADI packet it does not respond with a PADO packet.

Recall that in the third step of the discovery stage, the host sends a unicast session request packet. This packet may be referred to as a PPPoE Active Discovery Request (or "PADR") packet. The host that sent the PADI packet may receive more than one PADO packets in response. The host chooses one of these PADO packets. (The choice can be based on the AC-Name or the services offered by the access concentrator.) The host then sends one PADR packet to the access concentrator selected. The destination address field 1230 is set to the unicast Ethernet address of the selected access concentrator. The code field 1340 is set to 0x19 and the session ID field 1350 is set to 0x0000. The PADR packet contains one TAG of TAG_TYPE Service-Name, indicating the service the host is requesting, and any number of other TAG types.

Finally, recall that in the fourth step of the discovery stage, the selected access concentrator sends a confirmation packet. This confirmation packet may be referred to as a PPPoE Active Discovery Session-confirmation (or "PADS") packet. More specifically, when the selected access concentrator receives a PADR packet, it prepares to begin a PPPoE session. It generates a unique session ID value for the PPPoE session and replies to the host with a PADS packet. The destination address field 1230 is the unicast Ethernet address of the host that sent the PADR. The code field 1340 is set to 0x65 and the session ID field 1350 is set to the unique value generated for this PPPoE session. The PADS packet contains one TAG of TAG_TYPE Service-Name, indicating the service under which access concentrator has accepted the PPPoE session, and any number of other TAG types. If the access concentrator does not like the Service-Name in the PADR packet, will then reply with a PADS packet containing a TAG of TAG_TYPE Service-Name-Error (and any number of other TAG types). In this case the session ID field 1350 is set to 0x0000.

A PPPoE Active Discovery Terminate (or "PADT") packet may be sent anytime after a session is established to indicate that a PPPoE session has been terminated. It may be sent by either the host or the access concentrator. The destination address field 1230 is a unicast Ethernet address, the code field 1340 is set to 0xa7, and the session ID field 1350 be set to identify the session which is to be terminated. No TAGs are required. When a PADT is received, no further PPP traffic is allowed to be sent using that session.

As stated above, once the discovery stage is complete, the PPP session stage commences. Once the PPPoE session begins, PPP data is sent as in any other PPP encapsulation. All Ethernet packets are unicast. The Ether type field 1250' is set to 0x8864. The PPPoE code field 1340 is set to 0x00. The session ID field 1350 is the value assigned (by the access concentrator) in the fourth step discovery stage. The PPPoE payload contains a PPP frame. The frame begins with the PPP Protocol-ID.

§ 1.2.4 Challenges Faced by Customers Having LAN(S) Accessing Multiple DSL Lines Currently, modem development to support digital subscriber line (or "DSL") services assumes that a single DSL line is extended from a communications provider (such as a regional bell operating company or "RBOC") to a customer's premises. (Recall, for example, customers 1010 in FIG. 10.) In some instances, often when the customer premises supports a small business or home office, a single DSL line may not provide sufficient bandwidth for the customer's needs. Instead of buying a dedicated line (i.e., T1 or T3 connection), some customers may find that purchasing multiple DSL lines to their premises is more affordable. Many of such customers will have local area networks (or LANs).

FIG. 15 is a high level block diagram which illustrates an environment 1500 in which a customer, having a local area network, has more than one digital subscriber line 1560 to a facility 1520 of a communications provider. The customer will often want to allow one of their terminals 1512, such as a computer for example, to call the Internet service provider's router and act like a full-blown Internet host. To reiterate, such a connection may be established in accordance with the point-to-point protocol, as described in § 1.2.3.1 above, or more specifically, via the point-to-point protocol over Ethernet protocol (or PPPoE) described in § 1.2.3.4 above.

As FIG. 15 shows, the premises 1510 of the customer may have a LAN, such as an Ethernet LAN, defined by a Ethernet hub or bridge 1514 having a number of terminals 1512, such as computers for example, connected to it. The Ethernet hub or bridge 1514 may also be coupled with a number of ADSL terminating units-remote (or "ATU-Rs") 1516. If an Ethernet hub 1514 is used, the hub 1514 merely provides a simple means of connecting the terminals 1512 of the LAN. If an Ethernet bridge is used, it may learn the layer 2 (e.g., MAC) addresses of the terminals 1512 connected to it.

ADSL terminating units-remote or ("ATU-R") 1516 support the ADSL service and has a matching unit, an ADSL terminating unit-central office (or "ATU-C") 1522 located at a facility, such as a central office, of a communications provider 1520. An ATU-R 1516 and ATU-C 1522 pair, in combination, support a high data rate over standard copper telephone wires 1160.

At the communications provider facility 1520, the DSLAM containing the ATU-C units 1522 may be connected with a bridge 1524. The bridge 1524 may be used to connect the communications provider facility 1520 with an Internet service provider server 1540. The Internet service provider server 1540 should support point-to-point protocol over Ethernet (or "PPPoE") sessions. Note that the terminals 1512 should also support PPPoE session (using software often referred to as "SHIMs").

Unfortunately, using the point-to-point protocol over Ethernet (or "PPPoE") protocol does not allow a straightforward transition from a single DSL line to multiple DSL lines. More specifically, the PPPoE protocol assumes an Ethernet infrastructure. Referring to FIG. 15, each terminal (such as a personal computer for example) 1112 in the customer premises 1510 would possess an Ethernet network interface card (or "NIC"), and all terminals 1512 would connect to an Ethernet hub or Ethernet bridge 1514. An ADSL terminating unit-remote (or "ATU-R") 1516 would also connect to the Ethernet hub or learning bridge 1514. With current implementations of PPPoE, an ATU-R, which acts as learning bridge, is used to provide connectivity to the DSL network. This creates a problem for customers that want to use multiple DSL lines. More specifically, using multiple ATU-Rs connected to the Ethernet hub or Ethernet bridge may cause traffic loops (described in § 1.2.2.1 below) and race conditions (described in § 1.2.2.2 below) that may often prevent the customer from getting the bandwidth expected. Further, presently, users cannot implement any policies regarding which lines 1560 serve which terminals 1512.

§ 1.2.2.1 Loop Conditions

Recall from § 1.2.3.4 above that during a discovery stage of PPPoE, when a host (e.g., a terminal 1512) wants to establish a connection using PPPoE, it broadcasts a PPPoE Active Discovery Initiation (or "PADI") packet and one or more access concentrators may respond with a PPPoE Active Discovery Offer (or "PADO") packet. Due to the broadcast nature of the PPPoE Active Discovery Initiation (PADI) packets, each one of the ATU-R units 1516 will forward these packets and, consequently, receive PPPoE Active Discovery Offer (PADO) packets in response. When a response is received via one ATU-R, situations can result where the response is actually looped back to the other ATU-R. This would occur if the user's Ethernet hub is a repeated hub which sends all Ethernet frames it receives on one port out every other port. In turn, the Ethernet frame will cause the ATU-R which inadvertently receives the Ethernet frame to update its bridging table so that it believes the ISP's access router is now on the home LAN. This follows since it examines the Ethernet frame and sees a source MAC address that belongs to the ISP's router arriving on the port it uses to connect to the repeated hub. This means that no traffic will flow through this ATU-R until such time as it receives an Ethernet frame, via the DSL line that it terminates, from the ISP's router. Hence, the ability to utilize a second DSL line can be significantly hampered by the looping of received traffic from the ISP.

§ 1.2.2.2 Race Conditions

As just stated in § 1.2.2.1 above, during a discovery stage of PPPoE, when a host (e.g., a terminal 1512) wants to establish a connection using PPPoE, it broadcasts a PPPoE Active Discovery Initiation (or "PADI") packet and one or more access concentrators may respond with a PPPoE Active Discovery Offer (or "PADO") packet. As further just stated above, due to the broadcast nature of the PPPoE Active Discovery Initiation (PADI) packets, each one of the ATU-R units 1516 may forward these packets. It may turn out that one of the ATU-R units 1516 may always receive a PADI packet response first. Consequently, traffic between a customer's premises 1510 and its communications provider facility 1520 may not be balanced across the lines 1560. Indeed, a single line 1560 may end up serving a large amount of traffic while the other lines 1560 sit idle. Such a situation is clearly undesirable.

§ 2. SUMMARY OF THE INVENTION

The present invention discloses a device that can enforce user defined and/or configurable policies to select which DSL line a PPPoE session would use when there are multiple DSL lines present. This device avoids the adverse network conditions, introduced in § 1.2.2 above, that exist if the multiple DSL lines are directly connected to the premises local area network (or "LAN").

Once a DSL line is selected, the PPPoE session may be supported, in its entirety, over that selected DSL line.

In one embodiment disclosed, the device may include embedded DSL modems so external ATU-Rs would not be required. Furthermore, the complexity of the modem functionality would be reduced as the embedded modem would not require the learning bridge logic, which is currently implemented in external PPPoE capable modems. No changes to premises networking equipment (hubs, bridges, PCs) would be required to use this device.

§ 3. BRIEF DESCRIPTION OF THE DRAWINGS

FIG. 1 illustrates the way in which network communications schemes may be described by a stack of protocols.

FIG. 2 compares the OSI reference model and the TCP/IP protocol suite.

FIGS. 7A through 7C illustrate the transmission of data over a network in accordance with the TCP/IP protocol suite.

FIG. 11 illustrates the fields of an exemplary PADI frame.

FIG. 13 illustrates a payload for the point-to-point protocol over Ethernet (PPPoE) protocol.

FIG. 14 illustrates the format of TAGs which may be provided in the payload of a PPPoE protocol frame.

FIG. 18 illustrates a system in which a first embodiment of the present invention is incorporated.

FIG. 23 illustrates a system in which a second embodiment of the present invention is incorporated.

The present invention involves novel methods, apparatus and data structures for selecting a line for a connection to a service provider. The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications. Thus, the present invention is not intended to be limited to the embodiments shown and the inventor regards her invention as the following disclosed methods, apparatus and data structures and any other patentable subject matter.

In the following, an environment in which the present invention may operate is described in § 4.1. Then, functions which may be performed by the present invention are described in § 4.2. Then, exemplary processes, architectures, methods and data structures which may be used to effect those functions are described in § 4.3. Examples of operation are then provided in § 4.4. Finally, some conclusions regarding the present invention are set forth in § 4.5.

§ 4.1 Environment in which the Present Invention May Operate

Figure 1:
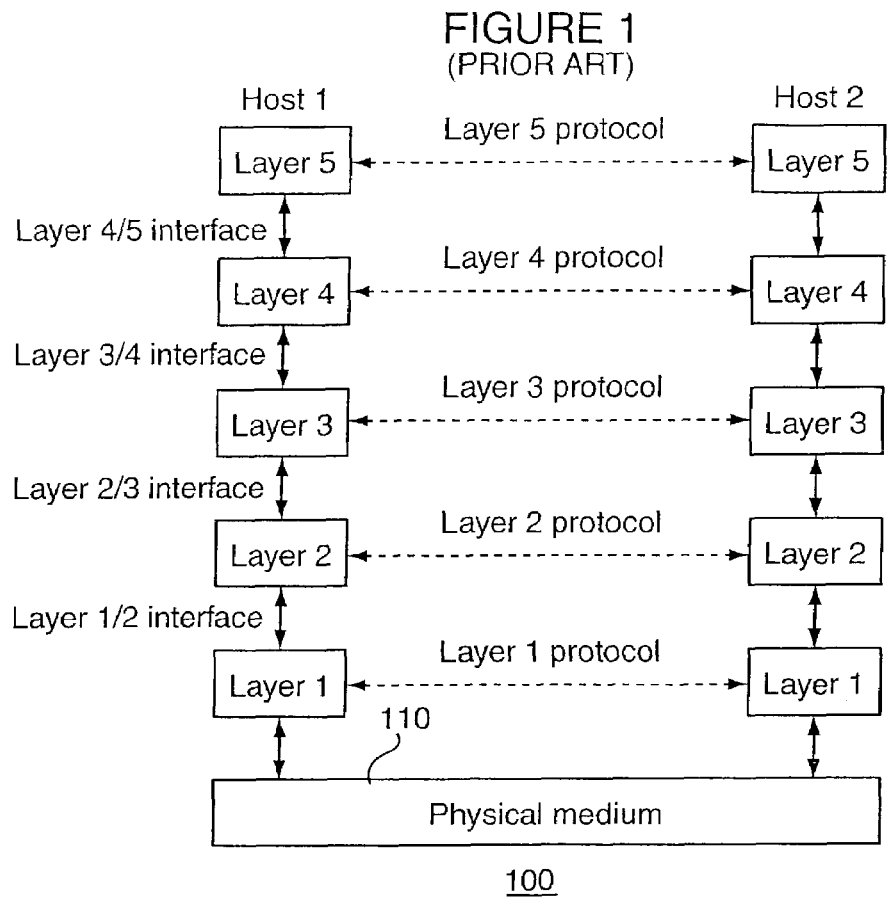
Figure 2:
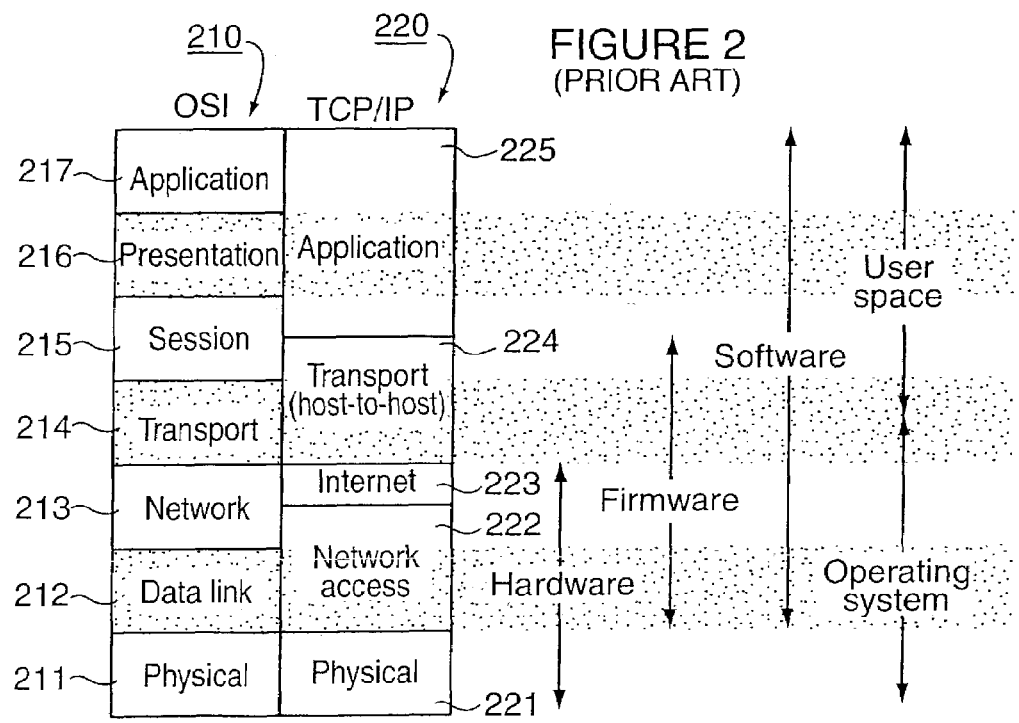
Figure 3:
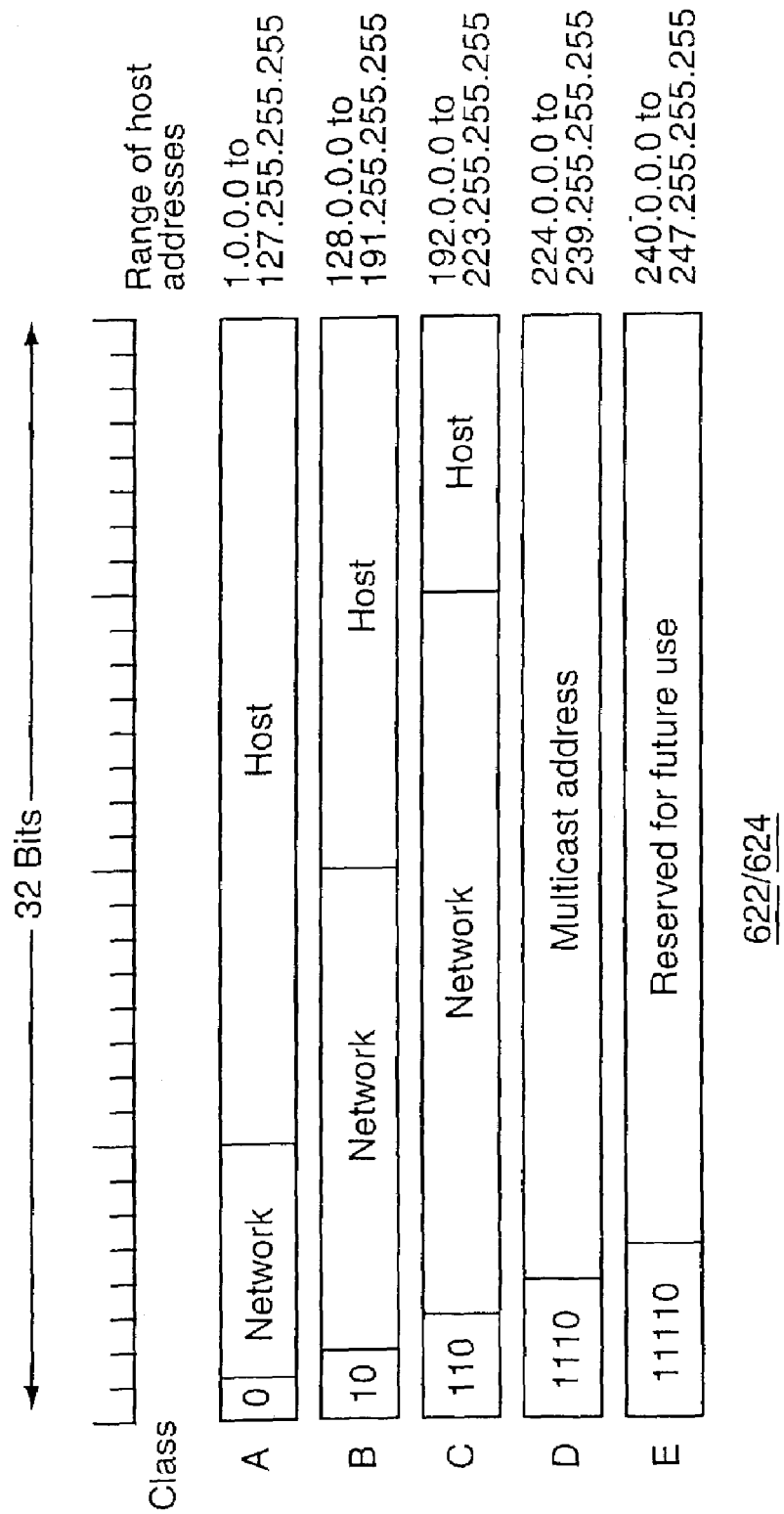
FIG. 3 illustrates internet protocol (or "IP") global addressing.
Figure 4:
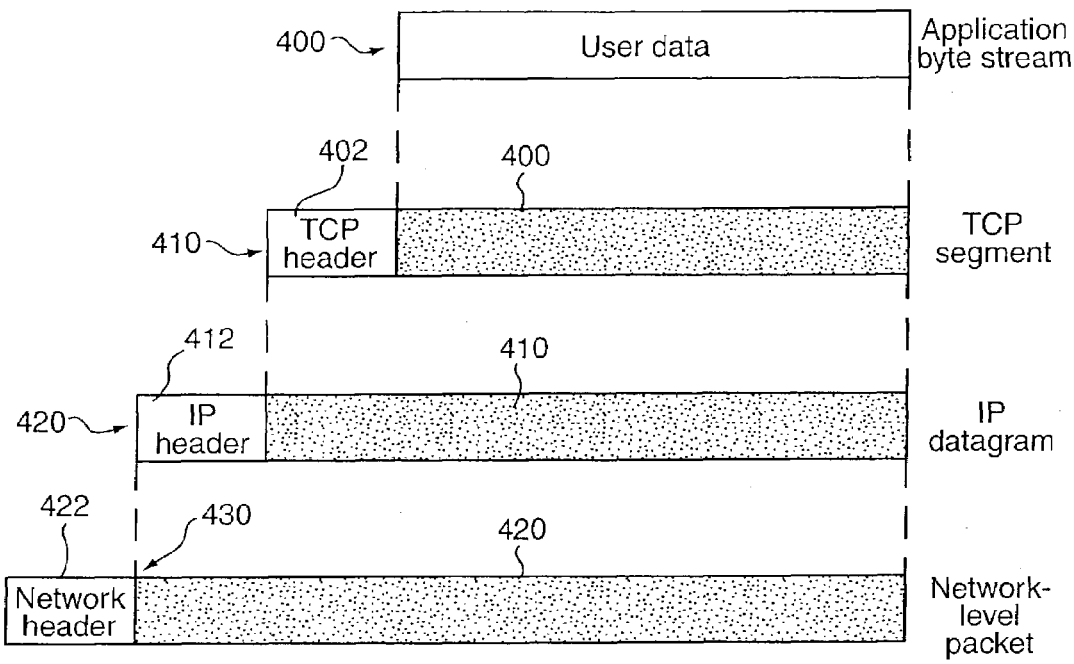
FIG. 4 illustrates the manner in which data is encapsulated by a TCP header, an IP header, and a network header in accordance with the TCP/IP protocol suite.
Figure 5:
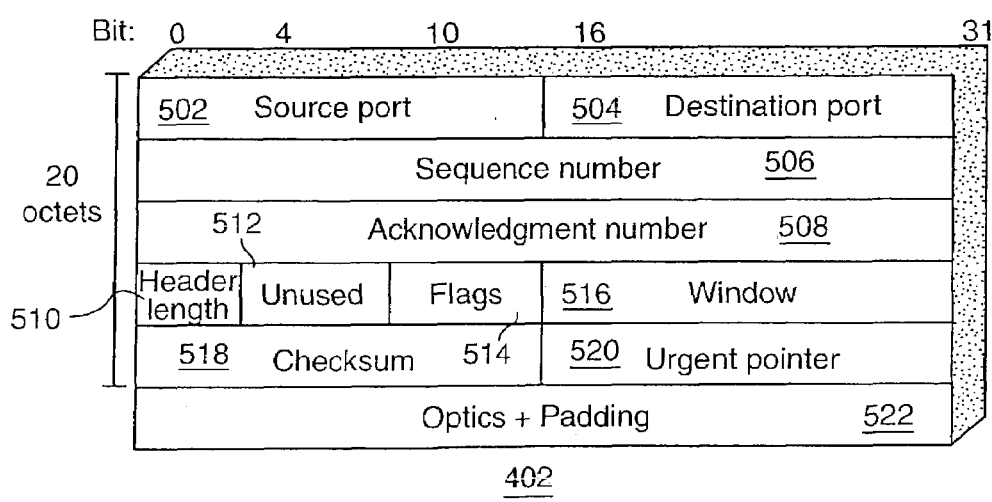
FIG. 5 illustrates the fields of a TCP header.
Figure 6A:
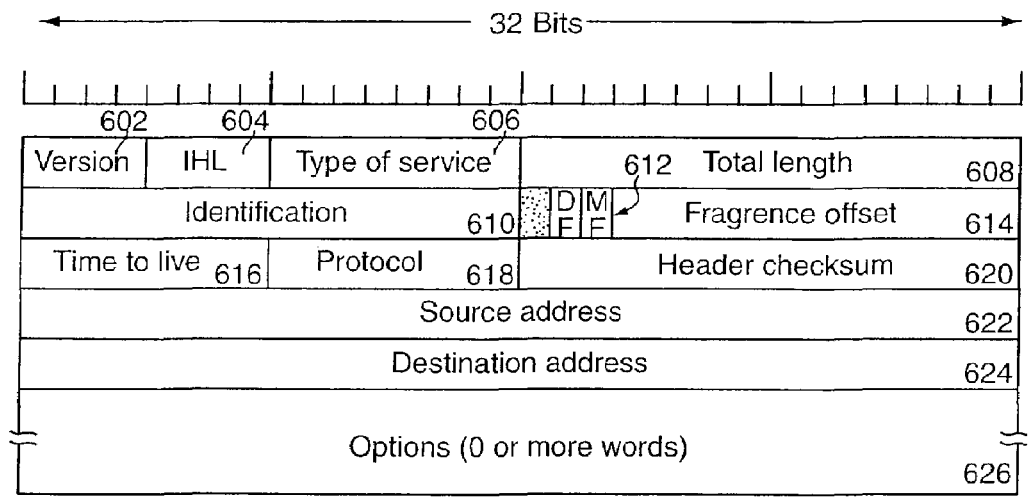
FIGS. 6A and 6B illustrate the fields of Version 4 and Version 6, respectively, of the IP header.
Figure 6B:
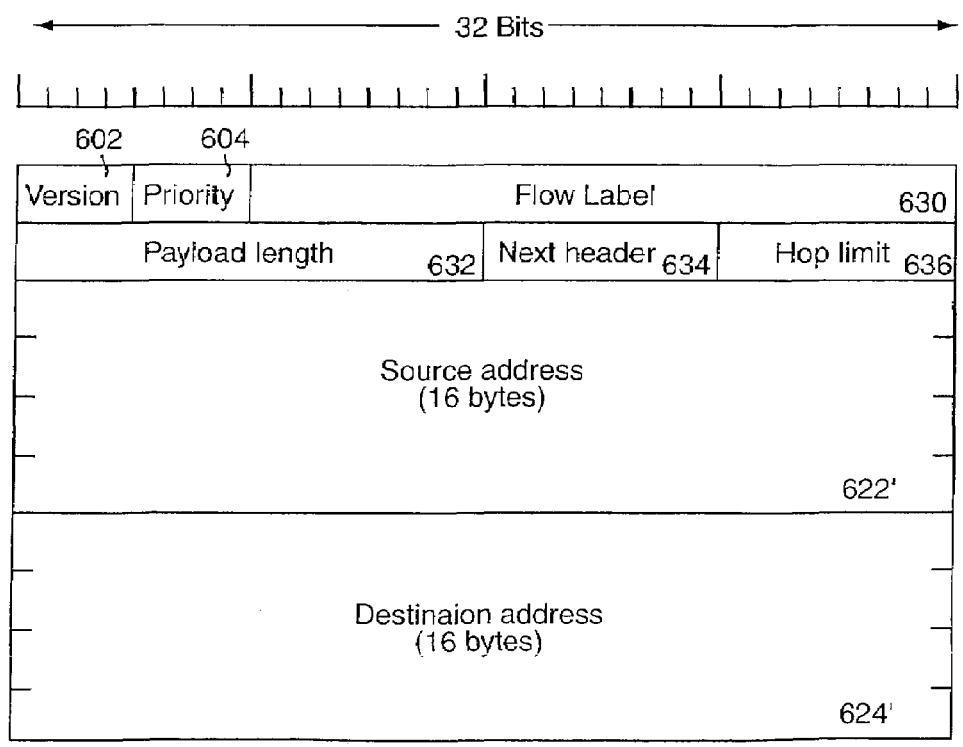
Figure 7B:
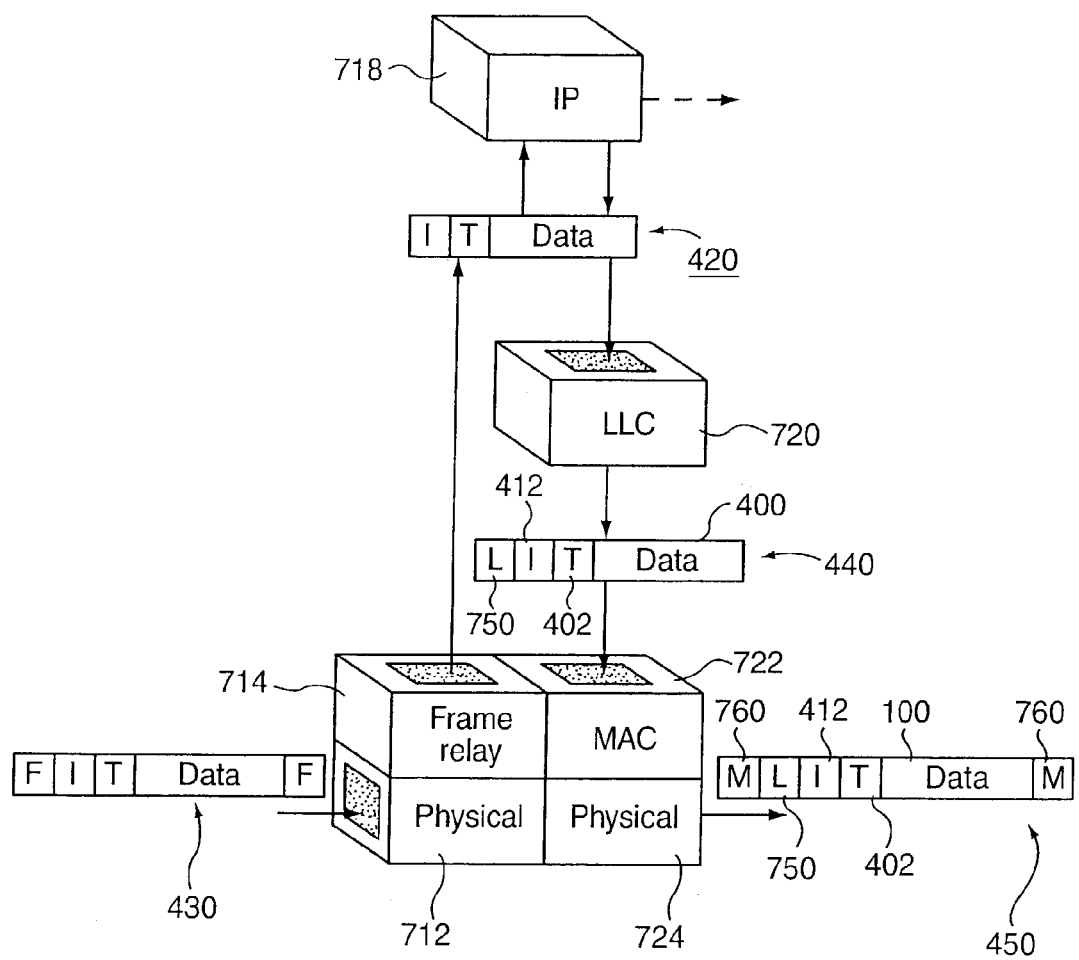
Figure 7C:
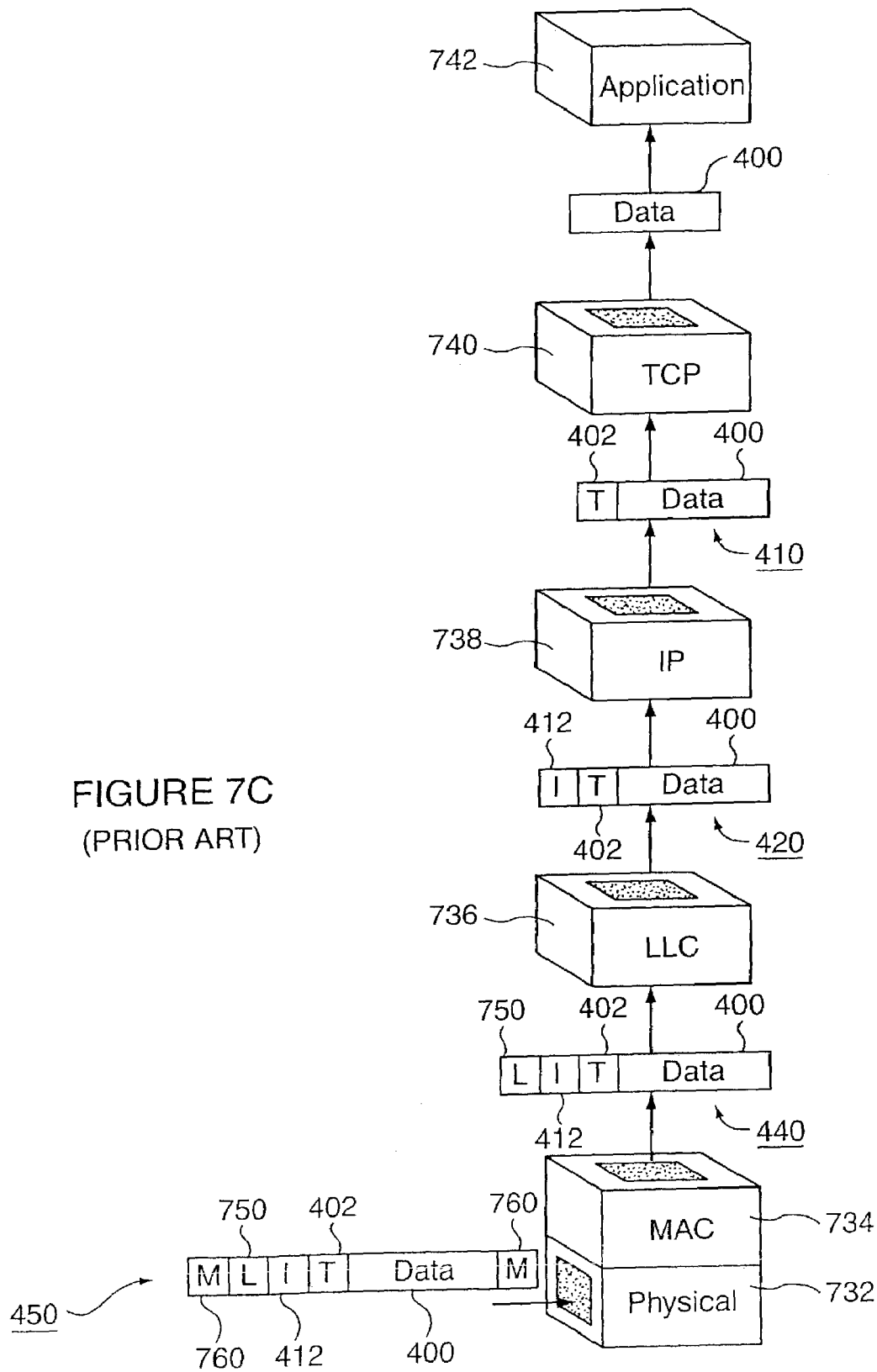
Figure 8:
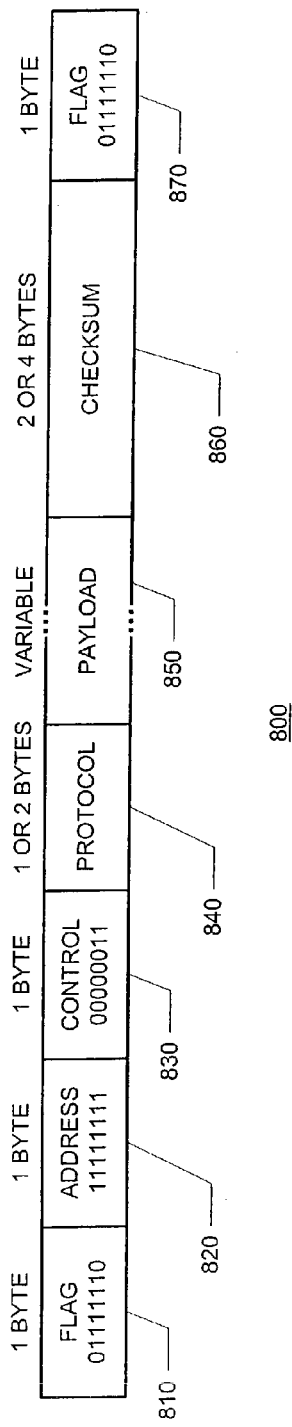
FIG. 8 illustrates a point-to-point protocol full frame format.
Figure 12:
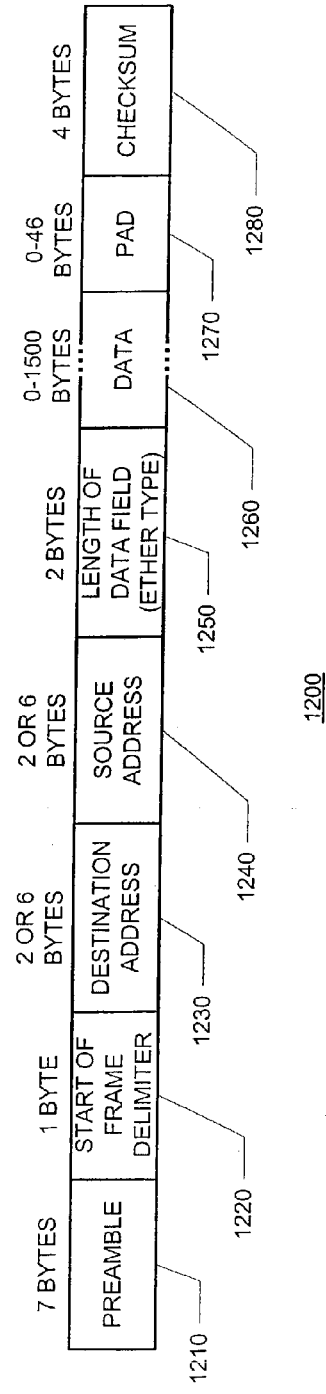
FIG. 12 illustrates fields of an Ethernet (and PPPoE) frame.
Figure 9:
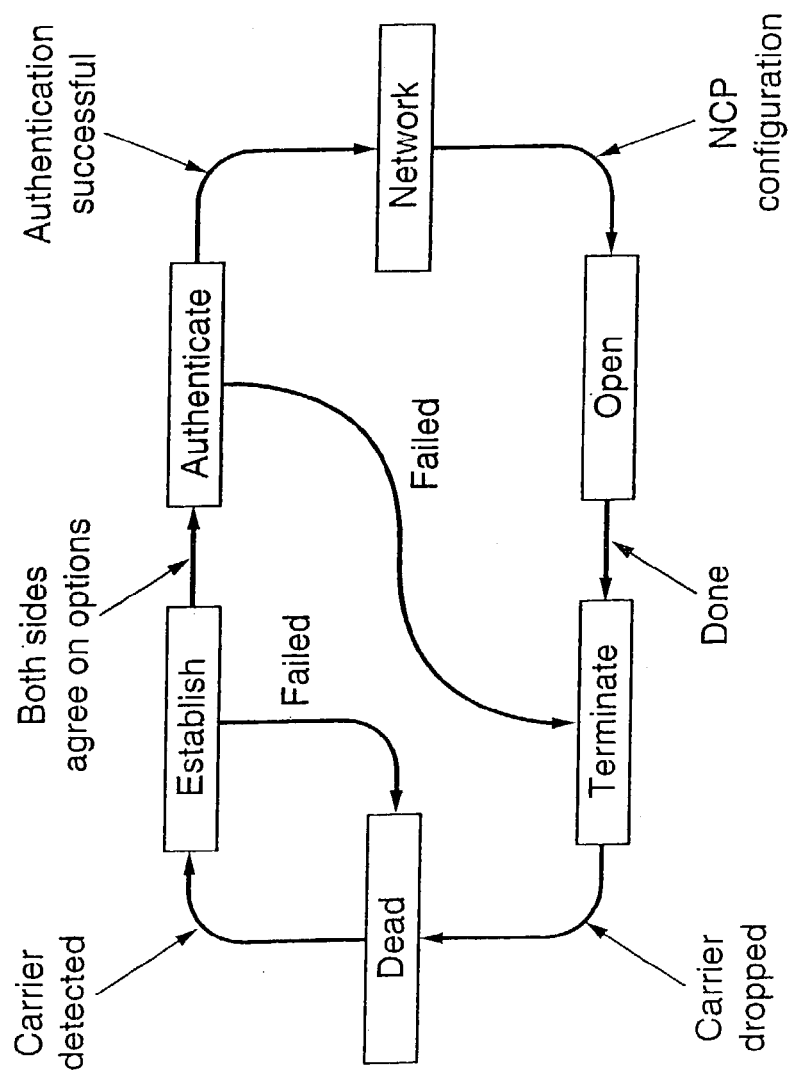
FIG. 9 is a simplified phase diagram for bringing a connection up and down in accordance with the point-to-point protocol.
Figure 10:
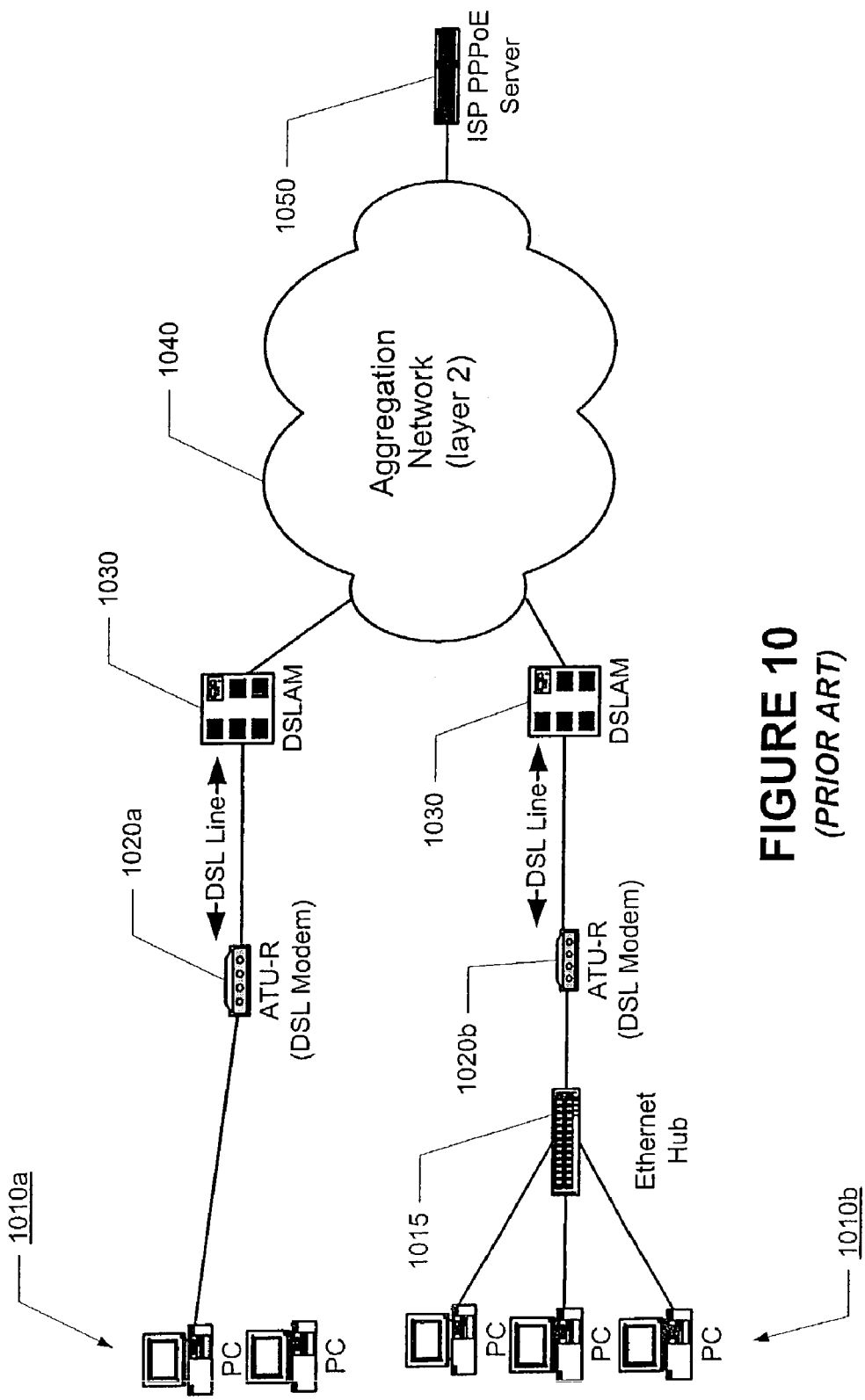
FIG. 10 illustrates customers having a single DSL line.
Figure 15:
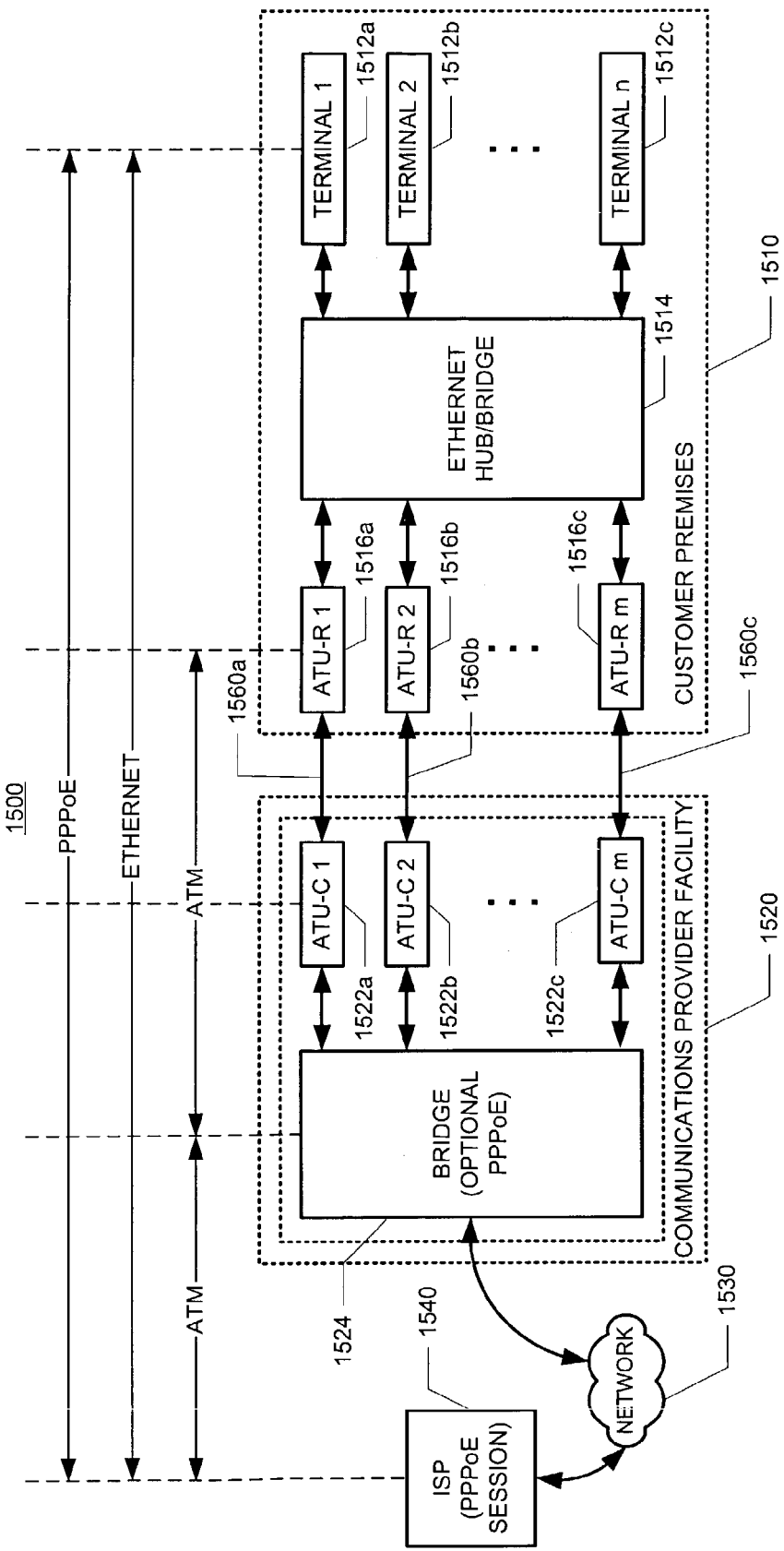
FIG. 15 illustrates a system in which a customer has a local area network and multiple access (e.g., digital subscriber line) lines.

The present invention may operate in environment such as the one described in § 1.2.4 above with reference to FIG. 15. The present invention may operate in the context of a customer premises having an Ethernet based LAN, and in the context of terminals having PPPoE host capabilities (also referred to as a "SHIM") and a service provider having PPPoE access concentrator capabilities.

§ 4.2 Functions which May be Performed by the Present Invention

The present invention may function to minimize or eliminate loop and race conditions at a customer premises having a number of lines to a communications provider facility. The present invention may do so by establishing and/or enforcing line selection policies. The present invention may also function to allow a customer to provision the use of their lines as they see fit. In this case as well, the present invention may do so by establishing and/or enforcing line selection policies.

§ 4.3 Exemplary Processes, Architecture, Methods and Data Structures

In the following, processes which may be performed by the present invention are introduced in § 4.3.1 below. Then, architecture, methods and data structures which may be used to effect these processes are described in the context of two (2) embodiments in §§ 4.3.2 and 4.3.3 below.

§ 4.3.1 Processes

Figure 16:
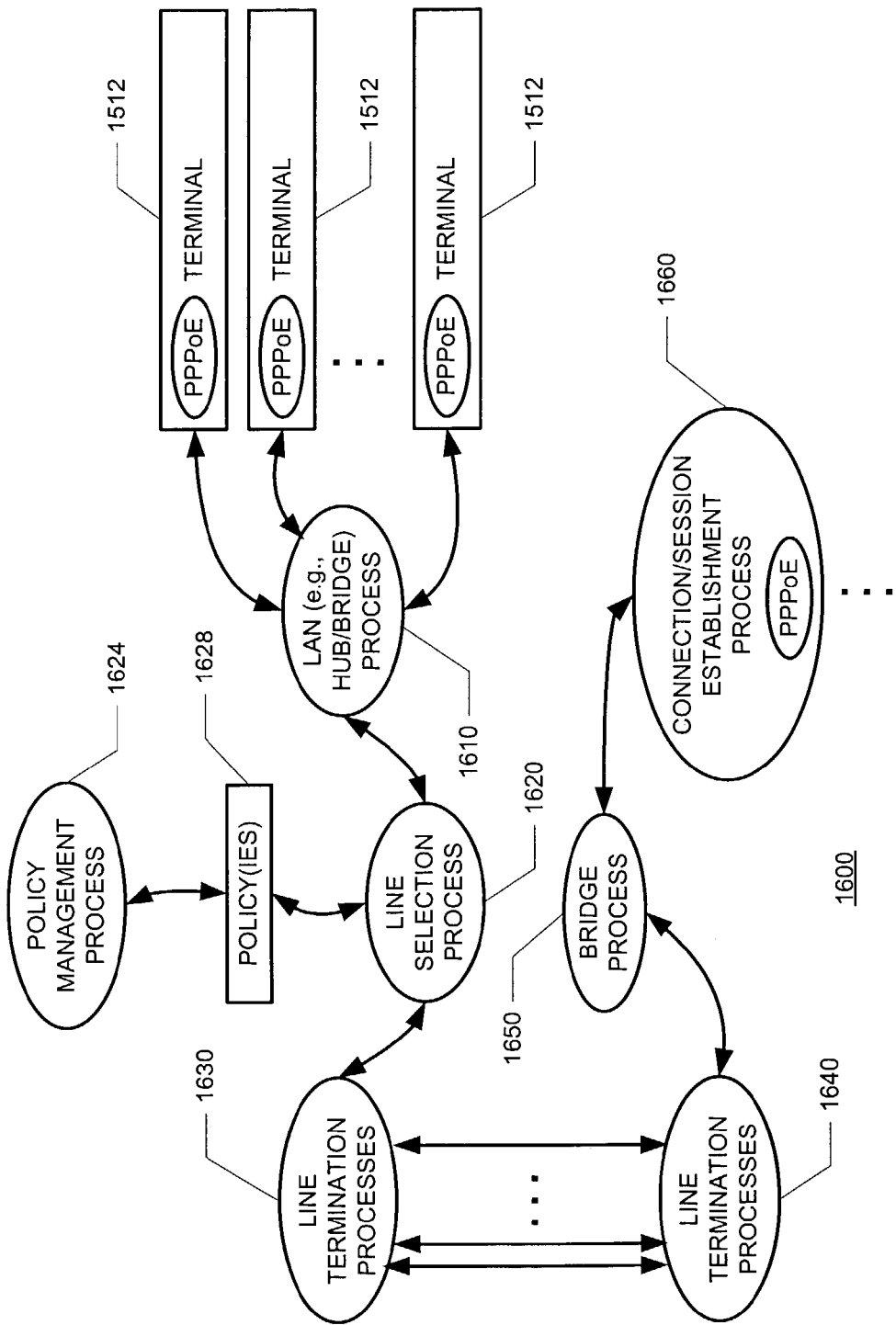
FIG. 16 is a bubble diagram which illustrates processes that may be performed in a system which incorporates at least some aspects of the present invention.

FIG. 16 is a high level bubble diagram of processes that may be performed by the present invention, and in particular, which may be performed by an environment in which the present invention may operate. A number of terminals 1512 may be connected with a hubbing/bridge process (or more generally, a networking process) 1610, which may be used to perform hubbing and/or bridging (or more generally, networking) functions, as described above for example. The hub/bridge process 1610 may be effected by known hub and/or bridge products.

The local area hub/bridge process 1610 may communicate with a line selection process 1620. The line selection process 1620 may permit a terminal 1512, which can communicate with the hub/bridge process 1610, to establish a session (e.g., a point-to-point protocol session) over a selected one of a number of lines. The line selection process 1620 may select the line to be used based on a policy or policies 1628. This policy(ies) may be put in place (and altered) by a customer using a policy management process 1624. The line selection policy(ies) may be a function of traffic (e.g., number of packets or frames per unit time, and/or number of sessions), past selection states (e.g., to implement a round robin scheme), the terminal 1512 requesting the session, a user requesting the session, a time, a present state of the line(s), and/or a present state of established sessions, etc.

A number of lines are terminated by line termination processes 1630 and 1640. The line termination processes 1630 may be effected by known ATU-R units and the line termination processes 1640 may be effected by known ATU-C units. A bridge process 1650 may communicate with the line termination processes 1640 to forward frames towards a connection/session establishment process 1660.

If the terminal and the entity running the connection/session establishment process are to communicate using the point-to-point protocol over Ethernet (PPPoE) protocol, then the terminal will support a PPPoE host process (SHIM).

Figure 17:
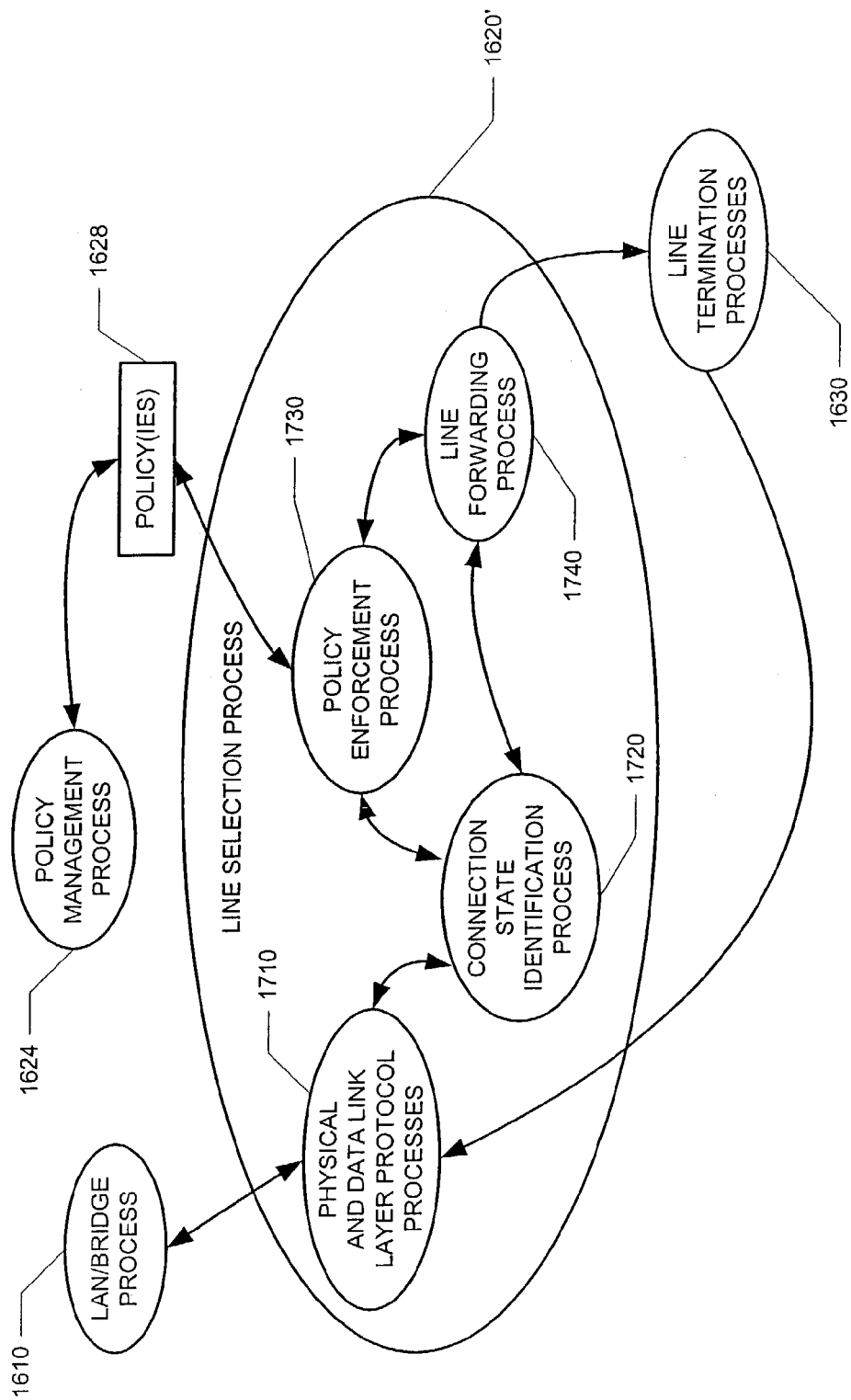
FIG. 17 illustrates processes that may be performed as a part of a line selection process.

FIG. 17 is a diagram of processes that may be included in the line selection process 1620. More specifically, physical and data link layer protocol process 1710 may enable communications with the hub/bridge process 1610. A connection state identification process 1720 may be used to determine the state of a connection, such as a PPPoE session connection. Thus, for example, the connection state identification process 1720 may determine whether or not a packet or frame corresponds to the discovery stage (i.e., no session defined yet) or the session stage (i.e., session assigned). If a session has not yet been established (or requested), and therefore, a line has not yet been selected, the frame or packet is forwarded to the policy enforcement process 1730 which may select one of the lines based on a policy or policies 1628.

Given a packet or frame without a defined session (e.g., a discovery stage frame) that has been assigned a line, or a packet or frame having a session, a line forwarding process 1740 is used to forward the packet or frame to the appropriate line, as terminated by an appropriate one of the line termination processes 1630.

Notice that frames or packets destined for the terminal are simply forwarded, from the appropriate one of the line termination processes 1630, directly to the physical and data link layer protocol processes 1710.

Having described processes that may be effected by the present invention, two (2) embodiments of the present invention are now described in §§ 4.3.2 and 4.3.3 below.

§ 4.3.2 First Embodiment

An architecture of a first embodiment of the invention is described in § 4.3.2.1 and methods and data structures which may be used in the first embodiment are described in § 4.3.2.2.

§ 4.3.2.1 Architecture

Figure 19:
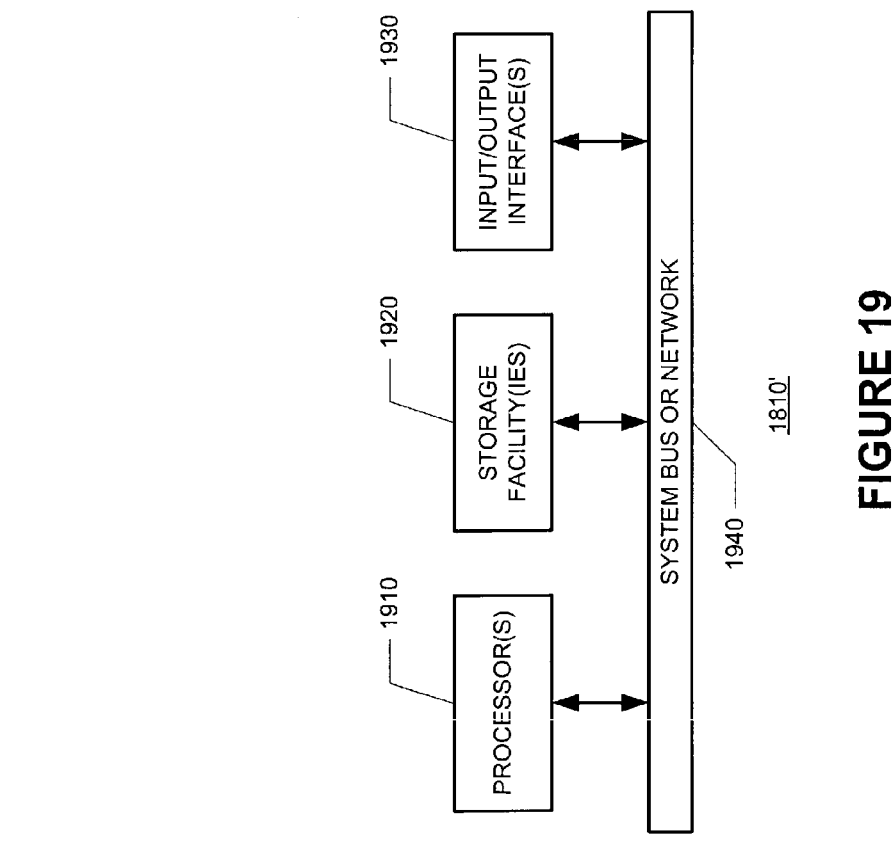
FIG. 19 illustrates a machine which may be used to effect various aspects of the present invention.

FIG. 18 is a high level block diagram of an exemplary system 1800 which employs at least some aspects of the present invention. As can be appreciated by a comparison of FIGS. 15 and 18, the present invention provides a line (e.g., a DSL line) selection unit 1810. The line selection unit 1810 may communicate with an (e.g., 100 Base T) Ethernet hub/bridge 1514 and may be used to select a line from the lines 1560 terminated by the ATU-Rs 1516. The line selection unit may have connections to the DSL network via RJ11 jacks. Each RJ-11 jack may support a separate instantiation of a DSL modem. Referring to FIG. 19, the line selection unit 1810' may include a processor(s) 1910 (such as a microprocessor, an application specific integrated circuit (or "ASIC"), or a programmable logic array (or "PLA") for example), a storage facility(ies) 1920 (such as RAM, ROM, magnetic storage means, optical storage means, etc. for example), input/output interfaces 1930 (such as a video driver, a video display, a keyboard, a pointer, a serial port, a parallel port, etc.), and a (e.g., an internal) bus or network 1940. The bus or network 2240 permits the components 1910, 1920 and 1930 to communicate with one another. The line selection unit 1810 may effect the line selection process 1620 (and the policy management process 1624) and may store the policy or policies 1628. The processes may be effected by the processor(s) 1910 executing instructions. The instructions may depend on the policies applied. These policies may be inputted via an input/output interface 1930. The storage facility may store the state of the existing sessions. Having described, at a high level, an architecture which may be used in the first embodiment of the present invention, exemplary methods and data structures are now described in § 4.3.2.2 below.

§ 4.3.2.2 Methods and Data Structures

Figure 20:
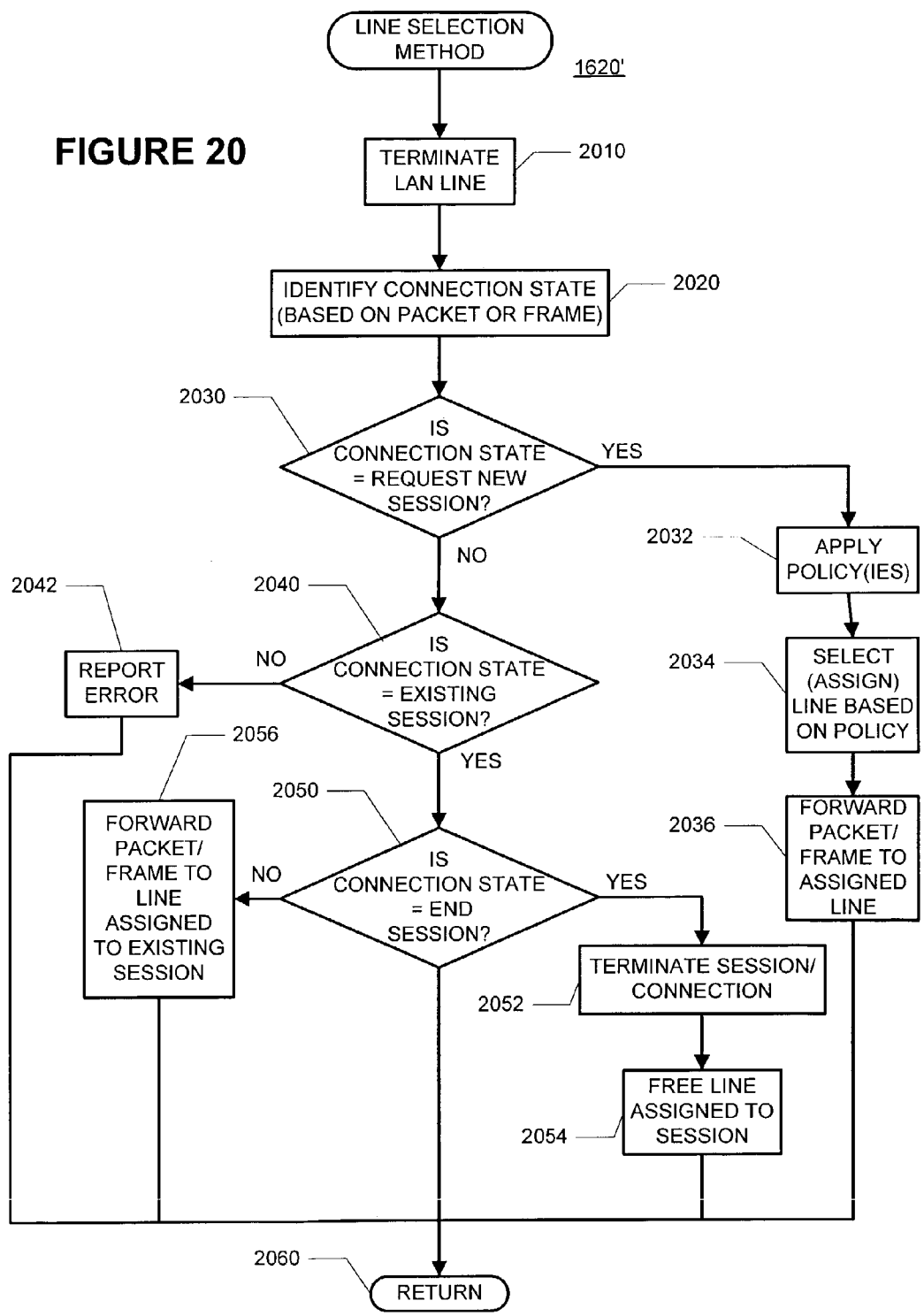
FIG. 20 is a flow diagram of an exemplary line selection method.

FIG. 20 is a high level flow diagram of an exemplary method 1620' that may be used to effect the line selection process 1620. As shown in block 2010, the LAN line is terminated. This block corresponds to the physical and data link layer protocol processes 1710 of FIG. 17. Then, in block 2020, the connection state (of a received packet or frame) is identified. This act corresponds to the connection state identification process 1720 of FIG. 17. An exemplary method for performing this act 1720 is described in the context of the PPPoE protocol with reference to FIG. 22 later. In this exemplary method 1620', the connection states may be (i) to request the establishment of a new session or packets or frames associated with the establishment of a new session, (ii) packets or frames associated with an existing session, but not terminating the session, and (iii) packets or frames requesting the termination of an existing session or associated with the termination of an existing session. Each of these connection states is now addressed, still referring to FIG. 20.

As shown in decision block 2030, it is determined whether the connection state is a request for a new session (or packets or frames associated with the establishment of a new session). If the connection state is a request for a new session, a policy is, or policies (recall 1628) are, applied as shown in block 2032, a line is assigned based on the policy or policies as shown in block 2034, and the packet or frame is forwarded to the assigned line as shown in block 2036. The method 1620' is then left via RETURN node 2060.

Figure 21:
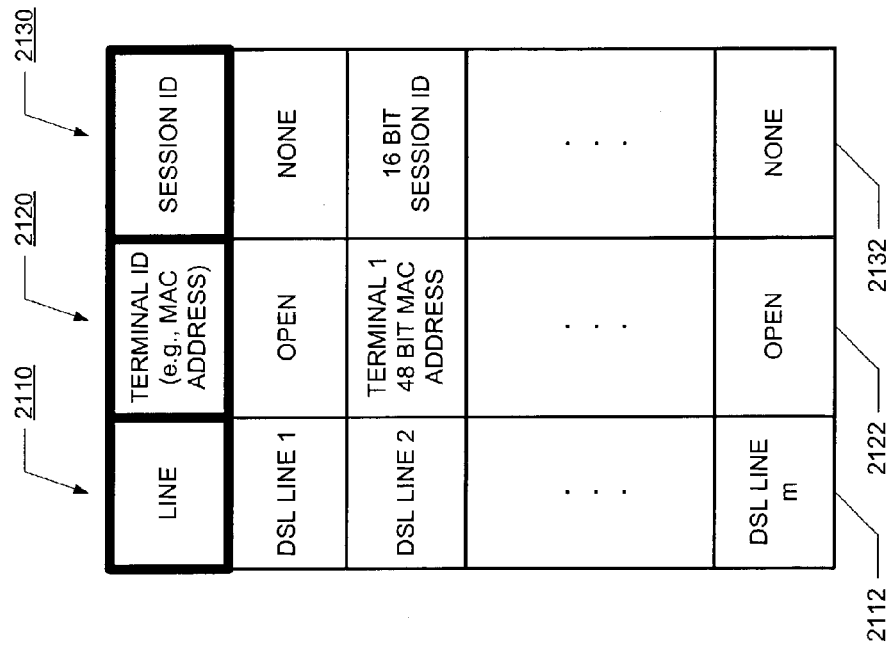
FIG. 21 is an exemplary table data structure which may be used to associate terminals (and sessions) with lines in accordance with the present invention.

Referring back to block 2034, a line is assigned to a terminal based on the policy or policies. FIG. 21 illustrates an exemplary table data structure 2100 for associating a line with a terminal. A column 2110 of the table 2100 includes identifications 2112 of the lines 1560, and a column 2120 of the table 2100 includes an indication 2122 of whether the line is free or whether a terminal 1512 is associated with the line. The identifications 2112 of the lines 1560 may be port numbers of the line selection unit 1810. The indication 2122 of a terminal 1512 associated with the line may be a source address (e.g., a MAC address) of the frame or packet. An optional column 2130 may include identifications 2132 of sessions supported by the lines 2112.

Referring back to FIG. 20, if the connection state is not a request for a new session (or a packet or frame associated with the establishment of a new session), the method 1620' proceeds to decision block 2040 where it is determined whether or not the connection state is an existing session. If not, the method 1620' may report an error, as shown in optional block 2042 and is left via RETURN node 2060. This is done because the connection is either associated with an existing session or it isn't. If, on the other hand, the connection state is an existing session, the method 1620' proceeds to decision block 2050.

At decision block 2050, it is determined whether or not the packet or frame is a request to terminate a session or associated with terminating a session. If not, the packet or frame is forwarded to the line assigned to the existing session as shown in block 2056, and the method 1620' is left via RETURN node 2060. (Recall FIG. 21.) If, on the other hand, the packet or frame is a request to terminate a session or is associated with terminating a session, the connection is terminated as shown in block 2052 and the line assigned to the terminal 1512 and/or session is freed as shown in block 2054 (Recall column 2120 and/or 2130 of table 2100 of FIG. 21.), and the method 1620' is left via RETURN node 2060. Thus, any Ethernet frame received from the customer premises 1510 LAN to support a given PPPoE session may be supported over a single embedded modem 1516 for the life of the session.

Figure 22:
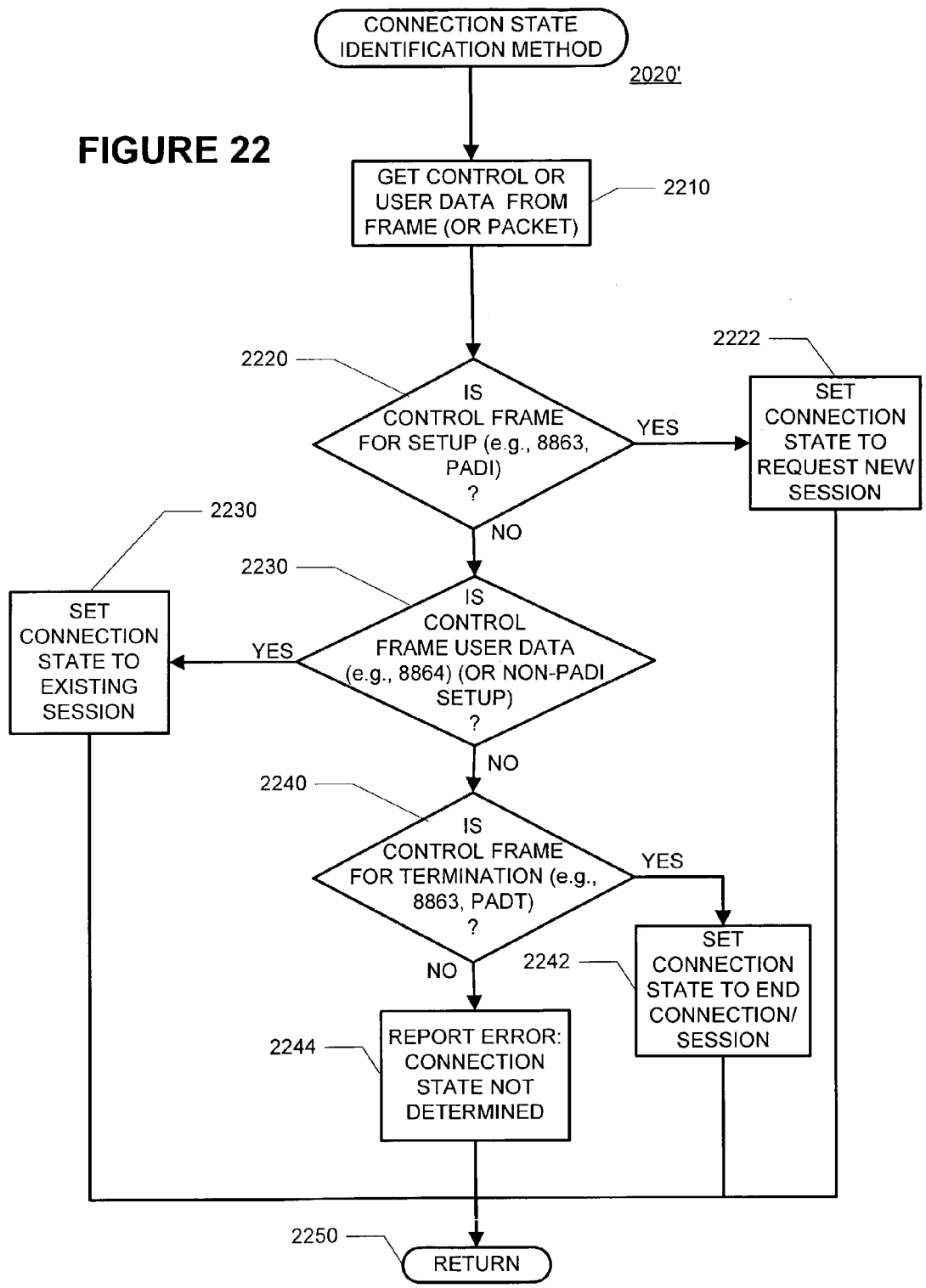
FIG. 22 is a flow diagram of an exemplary connection identification method which may be used with the method of FIG. 20 in the context of a system employing the PPPoE protocol.

Recall from block 2020 of FIG. 20 that the connection state is identified. FIG. 22 is a high level flow diagram of an exemplary method 2020' for identifying a session state in the context of the PPPoE protocol. As shown in block 2210, control or user data is taken from the frame (or packet). (Recall, Ether type field 1250' of the PPPoE frame 1200' and the code and session ID fields 1340 and 1350, respectively, within the data field 1260.) The method 2020' then proceeds to decision block 2220. At decision block 2220, it is determined whether or not the frame (or packet) is a request to establish a session. In the context of the PPPoE protocol, if the Ether type field 1250' is 0X8863 and the code field 1340 is 0X09 (indicating that the packet is a PPPoE Active Discovery Initiation (PADI) packet) (Recall FIG. 11.), the connection state is set to "request new session" as shown in block 2222. The method 2020' is then left via RETURN node 2250. Recognize that further packets associated with the discovery stage (e.g., PADO, PADR and PADS packets) should be assigned to the same line 1520. In this way, once a session is requested, a line is associated, even though the session may not necessarily yet be established and even though a session ID (Recall field 1350.) is not necessarily yet assigned.

Referring back to decision block 2220, if it is determined that the frame (or packet) is not a request to establish a session, the method 2020' proceeds to decision block 2230. At decision block 2230, it is determined whether or not the frame (or packet) merely carries user data for an established session (or whether or not the frame or packet is a PADO, PADR or PADS packet associated with establishing a session in response to a request). If so, the connection state is set to existing session as shown in block 2230 and the method 2020' is left via RETURN node 2250. More specifically, in the context of the PPPoE protocol, if the Ether type field 1250 is set to 0X8864, this indicates that the frame or packet is associated with an existing session (which should already be associated with a line). Furthermore, even if the Ether type field 1250 is set to 0X8863, but the packet is a PADO, PADR or PADS packet, since a line should have already been assigned in response to the receipt of a PADI packet, it is assumed, for the purposes of selecting a line, that a session has already been established although, strictly speaking, the PPPoE protocol is still in the discovery stage.

Referring back to decision block 2230, if it is determined that the frame (or packet) does not carry user data for an established session (and the frame or packet is not a PADO, PADR or PADS packet associated with establishing a session in response to a request), the method 2020' proceeds to decision block 2040 where it is determined whether or not the packet or frame is a request to tear down or terminate a session or connection. More specifically, in the context of PPPoE, if the code field 1340 is set to 0XA7, this indicates a request to terminate the session. If it is determined that the packet or frame is a request to tear down or terminate a session or connection, the connection state is set to end session as shown in block 2240, and the method 2020' is left via RETURN node 2250. If, on the other hand, it is determined that the packet or frame is not a request to tear down or terminate a session or connection, the connection state could not be determined and an error may be reported as shown in optional block 2244.

Having described exemplary architecture, methods and data structures for implementing a first embodiment of the present invention, a second embodiment of the present invention is now described in § 4.3.3 below.

4.3.3 Second Embodiment

FIG. 23 is a high level block diagram of a second embodiment 2300 of the present invention. As can be appreciated by comparing FIGS. 18 and 23, the main difference between the first and second embodiments is that in the second embodiment 2300, the ATU-Rs 1516' are incorporated into the (DSL) line selection unit 2310. Thus, referring back to FIG. 17, the line termination process 1630 would be a part of the line selection process 1620. Otherwise, the operations of the first and second embodiments 1800 and 2300, respectively, would be the same.

The embedded modem is more efficient than utilizing multiple external modems when supporting multiple DSL lines in a premises. This follows because the same DSL line selector logic can keep state for all modems as to what embedded modem a PPPoE session has been assigned. Similarly the same ATM logic (e.g., segmentation and reassembly (or "SAR")) can be used across modems. With separate DSL modems, separate SAR logic may be required. Furthermore, the current state of external ATU-Rs supporting PPPoE may require that a learning bridge algorithm be supported by the ATU-R. This is not required within the embedded modems.

§ 4.4 EXAMPLE OF OPERATION

Figure 24A:
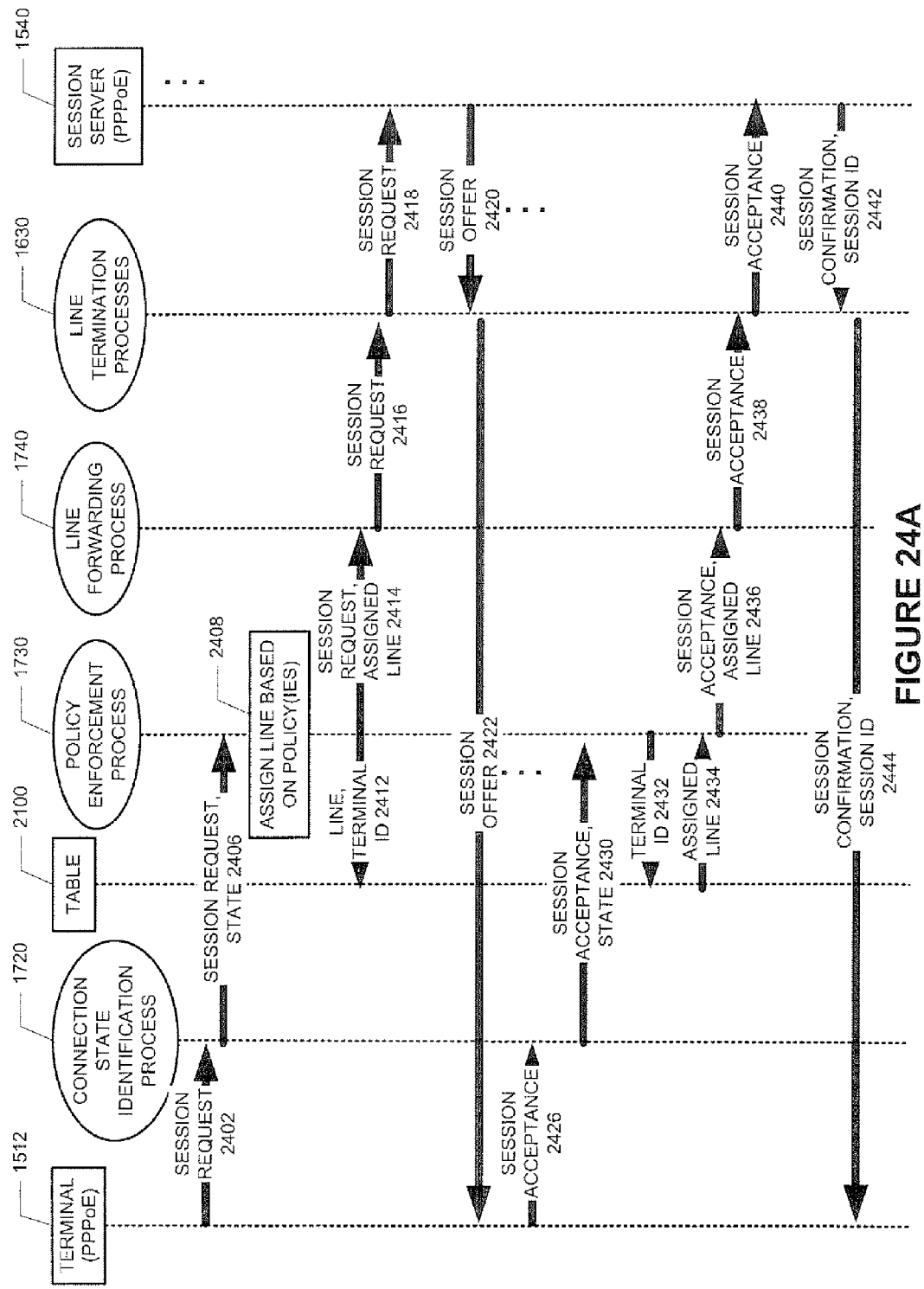
FIG. 24 illustrates an arrangement of FIGS. 24A and 24B which, collectively, define a communications flow diagram which illustrates an exemplary operation of at least some aspects of the present invention.

FIG. 24 illustrates the arrangement of FIGS. 24A and 24B which, collectively, define a messaging diagram which illustrates operations of the present invention when used in the context of the PPPoE protocol or a similar protocol. Since illustration of the LAN/bridge process 1610 at the customer premises 1510 and the line termination processes 1640 and bridging process 1650 at the communications provider facility 1520 are not necessary for a good understanding of the present invention, they are not shown in FIG. 24 in order to simplify this Figure.

As indicated by communication 2402, the terminal issues a session request which is forwarded (via the LAN/bridge process 1610, not shown) to the connection state identification process 1720. The connection state identification process 1720 identifies the communication as a request for a session and forwards it (and the determined state) to the policy enforcement process 1730 as shown by communication 2406. The policy enforcement process 1730 uses information (e.g., state, terminal ID, terminal address, user ID, past state, line state, etc.) to assign one of the lines 1520 based on a policy or policies 1628 (not shown) as indicated by block 2408. The assigned line and its associated terminal ID (e.g., the MAC address of the terminal 1512) are then used to update the table 2100 as shown in communication 2412. The policy enforcement process 1730 may also forward the session request and assigned line to the line forwarding processes 1740 in communication 2414. The line forwarding process 1740 uses the assigned line information in communication 2414 to forward the session request to a line termination process 1630 associated with the assigned line, as shown in communication 2416. The line communication process then forwards the session request (via a line, a line termination process 1640 and a bridge process 1650, not shown) to a session server 1540. Actually, since the session request is broadcast, it can be received by more than one session server 1540 (indicated by ellipses). Indeed, the other terminals 1512 coupled with the LAN hub/bridge 1514 may receive the request.

As indicated by communication(s) 2420, the session server(s) 1540 replies with a session offer(s) which is (are) forwarded (via the bridge process 1650, the line termination process 1640, and the line, not shown) to the line termination process 1630. The line termination process 1630 then forwards the session offer(s) (via the LAN/bridge process 1610, not shown) to the terminal 1512 as shown by communication(s) 2422.

The terminal 1512 then selects which session offer that it will accept. Once a session offer is accepted by the terminal 1512, the terminal 1512 sends a session acceptance communication 2426 with a destination address corresponding to the session server 1540 selected. More specifically, the session acceptance is forwarded (via the LAN/bridge process 1610, not shown) to the connection state identification process. The connection state identification process 1720 then forwards the session acceptance and its determined connection state to the policy enforcement process 1730. Using the source (e.g., MAC) address or other identification of the terminal 1512, the policy enforcement process looks up the assigned line associated with the terminal 1512 in table 2100, as denoted by 2432. The assigned line is provided to the policy enforcement process 1730 in communication 2434. The policy enforcement process 1730 then forwards the session acceptance and the assigned line to the line forwarding process 1740, as indicated by communication 2436. The line forwarding process 1740 then forwards the session acceptance to a line termination process 1630 associated with the assigned line, as indicated by communication 2438. The line termination process 1630 then forwards the session acceptance (via the line, the line termination process 1640 and the bridge process 1650, not shown) to the session server 1540 whose offer was accepted, as indicated by communication 2440.

As indicated by communication 2442, the session server 1540 replies with a session confirmation, which includes a session ID. This reply 2442 is forwarded (via the bridge process 1650, the line termination process 1640, and the line, not shown) to the line termination process 1630. The line termination process 1630 then forwards the session acknowledgement (with the session ID) (via the LAN/bridge process 1610, not shown) to the terminal 1512 as shown by communication 2444.

At this point, at least in accordance with the PPPoE protocol, the session stage is entered from the discovery stage. During the course of the session, the terminal 1512 may forward data (with session ID) to the session server 1540 and vice-versa. More specifically, referring to FIG. 14B, the terminal 1512 may forward data frames or packets (including a session ID) (via a LAN/Bridge process 1610, not shown) to the connection state identification process 1720, as shown by communication 2448. The connection state identification process 1720 forwards the data frame or packet (with the session ID) and a connection state to the policy enforcement process 1730 as indicated by communication 2452. Again, the policy enforcement process 1730 may use the source terminal identification (e.g., the terminal's 1512 MAC address) and/or a session ID to query the table 2100 for an assigned line as indicated by communication 2454. From the table 2100, line assigned to the terminal or session is provided as indicated by communication 2456. The policy enforcement process 1730 may then forward the data frame or packet (with the session ID) and the assigned line to the line forwarding process 1740, as indicated by communication 2458. The line forwarding process 1740 then forwards the data frame or packet (with the session ID) to a line termination process 1630 associated with the assigned line, as indicated by communication 2460. The line termination process 1630 then forwards the data frame or packet (with the session ID) (via the line termination process 1640 and the bridge process 1650, not shown) to the session server 1540, as indicated by communication 2462.

Further frames or packets of data may be communicated from the terminal 1512 to the session server 1540 in a similar manner.

Regarding communications from the session server 1540 to the terminal 1512, the session server 1540 forwards (via the bridge process 1650, the line termination process 1640, and the line, not shown) a data frame or packet (with session ID) to the line termination process 1630, as indicated by communication 2464. The line termination process 1630 then forwards the data frame or packet (with the session ID) (via the LAN/bridge process 1610, not shown) to the terminal 1512 as shown by communication 2466.

Further frames or packets of data may be communicated from the session server 1540 to the terminal 1512 in a similar manner.

With the PPPoE protocol, either the terminal 1512 of the session server 1540 may terminate a session. If the terminal 1512 initiates the termination of the session, it may forward a session termination request (with the session ID) (via the LAN/bridge process 1610, not shown) to the connection state identification process 1720, as indicated by communication 2470*b*. If the session server 1540 initiates the termination of the session, it may first be forwarded to the terminal 1512, in a manner similar to the other communications from the session server 1540 to the terminal 1512, described above, as shown by communication 2470*a*. The terminal 1512 may then forward the session termination request (with the session ID) (via the LAN/bridge process 1610, not shown) to the connection state identification process 1720. In any event, the connection state identification process 1720 will forward, at least the determined state and terminal identification (e.g., terminal 1512 MAC address) and/or session ID, to the policy enforcement process 1730. Once both the terminal 1512 and the session server 1540 have finished any necessary communications related to terminating the session (and connection), the policy enforcement process 1730 may send a request to update the table 2100 as indicated by communication 2472. The table 2100 may be updated by freeing the line assigned to the session.

In the forgoing description and examples, notice that establishing a session and terminating a session may often involve multiple communications between the terminal 1512 and session server 1540. In a preferred embodiment of the present invention, the policy enforcement process 1730 assigns a line and updates the table 2100 to reflect this assignment upon receipt of the first communication requesting to establish a session. Subsequent communications related to establishing a session (e.g., offer, acceptance and acknowledgement messages) may be treated as normal communications of an established session. Similarly, in a preferred embodiment of the present invention, the policy enforcement process 1730 frees a line and updates the table 2100 to reflect this fact upon receipt of the last communication requesting to terminate a session or connection. Prior communications related to terminating a session may be treated as normal communications of an established session.

§ 4.5 CONCLUSIONS

The line selection devices of the present invention may be user configurable to allow session distribution policies to be configured in it via a management interface. (This interface could be web based or via an RS-232 serial console interface.) There are numerous policies that can be defined. The following list provides some examples:

Round robin—each PPPoE session that arrives from the premises LAN is assigned a (DSL) line in round robin order.

Least loaded—An arriving PPPoE session is assigned to the (DSL) line that has the least of amount of traffic load over the past time interval, where the time interval may be user definable (e.g., 5 minutes).

Static assignment—An arriving PPPoE session from a given terminal (e.g., PC) is always assigned to the same (DSL) line. The terminal's MAC address may be used as the identifier to assess to which line the session is assigned.

Benefits of the line selection devices of the present invention include the following. First, it allows businesses to take statistical advantage of their (DSL) lines. This follows since one (1) line per terminal (e.g., PC) is not required. Second, it allows the customer to define the policy to determine how the (DSL) lines are utilized. Third, it allows existing LAN equipment to be used with multiple (DSL) line implementations. More specifically, it eliminates adverse effects of using multiple (DSL) lines with an Ethernet-based infrastructure. Fourth, it allows (DSL) line redundancy to be easily supported as the algorithms can be structured to ignore lines that have failed when assigning new PPPoE sessions. Finally, it achieves economies of scale by allowing the same ATM and control logic to support multiple embedded modems.

What is claimed is:

1. A method for use in a system at a premises, the system having at least one terminal, a local area network including the at least one terminal, and coupled with units that terminate at least two communications links between the premises and a communications provider facility located off of the premises, the method comprising:
   a) accepting data on the local area network;
   b) determining whether the data accepted concerns establishing a connection or is part of an established connection;
   c) if it is determined that the data accepted concerns establishing a connection, then
      i) selecting, at the premises, only one of the at least two communications links based on a policy, wherein the selection is controlled such that selection of more than one of the at least two communications links may not occur,
      ii) assigning the selected one of the at least two communications links to a session to be associated with the data accepted, and
      iii) forwarding the data accepted to only the selected one of the at least two communications links and not to any non-selected ones of the at least two communications links; and
   d) if it is determined that the data accepted is part of an established connection, then forwarding the data accepted to the assigned communications link.

2. The method of claim 1 wherein the data is a PPPoE frame.

3. The method of claim 2 wherein the act of determining whether the data accepted concerns establishing a connection or is part of an established connection is based on an Ether-type field of the PPPoE frame.

4. The method of claim 1 wherein if the data is a PPPoE Active Discovery Initiation packet, then determining that the data concerns establishing a connection.

5. The method of claim 1 wherein if the data is a packet selected from a group of packets consisting of (a) a PADO packet, (b) a PADR packet, (c) a PADS packet, and (d) a session stage packet, then determining that the data is part of an established connection.

6. The method of claim 1 further comprising:
   c) if it is determined that the data accepted concerns establishing a connection, then
      iv) storing the selected one of the at least two communications links and an associated session ID.

7. The method of claim 6 further comprising:
   c) if it is determined that the data accepted concerns establishing a connection, then storing a terminal ID.

8. The method of claim 6 further comprising:
   e) if it is determined that the data accepted is part of an established connection, and that the data is a request to terminate the connection, then
      i) freeing the selected one of the at least two communications links, and
      ii) permitting the stored selected one of the at least two communications links and the associated session ID to be overwritten.

9. The method of claim 1 wherein the policy upon which the one of the at least two communications links is selected is a function selected from a group of functions consisting of (a) past selection states, (b) a terminal source of the accepted data, (c) a user associated with the accepted data, and (d) a time.

10. The method of claim 1 further comprising:
    e) if it is determined that the data accepted is part of an established connection, and that the data is a request to terminate the connection, then freeing the selected one of the at least two communications links.

11. A method of claim 1 wherein the connection is a connection to a PPPoE session server.

12. The method of claim 1 wherein data looping in the system, before session establishment, is prevented.

13. The method of claim 1 wherein the act of selecting is performed before the data is communicated over any of the at least two communications links.

14. A method for use in a system at a premises, the system having at least one terminal, a local area network including the at least one terminal, and coupled with units that terminate at least two communications links between the premises and a communications provider facility located off of the premises, the method comprising:
    a) accepting data originating from the at least one terminal and from the at least two communications links; and
    b) forwarding data towards the at least one terminal and towards the at least two communications links,
    wherein, upon receiving a session request from the at least one terminal,
       i) assigning, at the premises, only one of the at least two communications links to the session of the session request based on a policy, wherein the assignment is controlled such that assignment of more than one of the at least two communications links may not occur, and
       ii) forwarding the session request to only the assigned one of the at least two communications links and not to any non-selected ones of the at least two communications links.

15. The method of claim 14 wherein, upon receiving a session offer, forwarding the session offer towards the terminal which requested the session.

16. The method of claim 15 wherein, upon receiving a session acceptance from the at least one terminal, forwarding the session acceptance to the assigned one of the at least two communications links.

17. The method of claim 16 wherein, upon receiving a session confirmation, forwarding the session confirmation towards the terminal which sent the session acceptance.

18. The method of claim 14 wherein, upon receiving a data with an associated session identification, forwarding the data to the one of the at least two communications links associated with the session identification.

19. The method of claim 14 wherein the act of assigning one of the at least two communications links based on a policy, further includes,
    A) storing the assigned communications link and an identification of the terminal sending the session request.

20. The method of claim 14 wherein the act of forwarding the session request to the assigned one of the at least two communications links, further includes,
    A) forwarding the session request and the assigned communications link to a line forwarding process, and
    B) forwarding the session request from the line forwarding process to the assigned communications link.

21. The method of claim 14 wherein the policy upon which the one of the at least two communications links is selected is a function of factors selected from a group of factors consisting of (a) past selection states, (b) a terminal source of the accepted data, (c) a user associated with the accepted data, and (d) a time.

22. The method of claim 14 wherein data looping in the system, before session establishment, is prevented.

23. The method of claim 14 wherein the act of assigning is performed before the data is communicated over any of the at least two communications links.

24. A link selection unit for use in a system at a premises, the system (i) including a local area network including at least one terminal and (ii) terminating at least two communications links from the premises to a communications provider facility off of the premises, the link selection unit comprising:
   a) means for accepting data from the local area network;
   b) means for determining a connection state based on the data accepted;
   c) means for selecting, at the premises, only one of the at least two communications links when the means for determining a connection state determines that a connection has not yet been established, wherein the means for selecting preclude selection of more than one of the at least two communications links;
   d) means for forwarding data for an unestablished connection only to the selected one of the at least two connection states and not to any non-selected ones of the at least two communications links; and
   e) means for forwarding data to the selected one of the at least two communications links when the means for determining a connection stated determines that a connection has already been established.

25. The link selection unit of claim 24 further comprising:
   e) link termination units, each of the link termination units terminating an associated one of the at least two communications links.

26. The link selection unit of claim 25 wherein each of the link terminations units is an ADSL terminating unit-remote.

27. The link selection unit of claim 24 further comprising:
   e) a storage device for storing policies used by the means for selecting one of the at least two communications links to determine which of the at least two communications links to select.

28. The link selection unit of claim 27 wherein the policies are a function of factors selected from a group of factors consisting of (a) past selection states, (b) a terminal source of the accepted data, (c) a user associated with the accepted data, and (d) a time.

29. The link selection unit of claim 27 further comprising:
   f) means for managing the policies stored in the storage device.

30. The link selection unit of claim 24 wherein data looping in the system, before session establishment, is prevented.

31. The link selection unit of claim 24 wherein each of the at least two communications links are terminated by simple modems without learning bridge logic.

32. The link selection unit of claim 24 wherein the means for selecting selects one of the two communications links before the means for forwarding data forwards the data for the unestablished connection.

* * * * *